(12) United States Patent
Hardwick

(10) Patent No.: US 6,292,822 B1
(45) Date of Patent: *Sep. 18, 2001

(54) DYNAMIC LOAD BALANCING AMONG PROCESSORS IN A PARALLEL COMPUTER

(75) Inventor: Jonathan C. Hardwick, Cambridge (GB)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/107,933

(22) Filed: Jun. 30, 1998

Related U.S. Application Data
(60) Provisional application No. 60/085,320, filed on May 13, 1998.

(51) Int. Cl.[7] .................................................. G06F 9/00
(52) U.S. Cl. ........................... 709/105; 709/102; 709/103
(58) Field of Search .................................... 709/100, 102, 709/103, 105, 104, 106, 108, 101; 717/10, 6, 11; 712/229, 331

(56) References Cited

U.S. PATENT DOCUMENTS

| | | | |
|---|---|---|---|
| 4,403,286 | 9/1983 | Fry | 709/105 |
| 4,931,931 | 6/1990 | Syre et al. | 709/100 |
| 5,121,494 | 6/1992 | Dias et al. | 707/2 |
| 5,230,053 | 7/1993 | Zaiki | 395/706 |
| 5,412,799 | 5/1995 | Papadopoulos | 703/22 |
| 5,448,686 | 9/1995 | Borrel | 345/423 |
| 5,450,554 | 9/1995 | Zaiki | 395/706 |
| 5,481,723 | 1/1996 | Harris et al. | 395/706 |
| 5,535,393 | 7/1996 | Reeve | 395/706 |
| 5,586,326 | 12/1996 | Ryu | 395/701 |
| 5,706,415 | 1/1998 | Kelley | 345/426 |
| 5,768,594 | 6/1998 | Blelloch et al. | 395/706 |
| 5,799,142 | 8/1998 | Toyoda | 714/38 |
| 5,812,811 | 9/1998 | Dubey et al. | 712/216 |
| 5,860,009 | 1/1999 | Uchihira | 717/6 |
| 5,943,663 | 8/1999 | Mouradian | 706/45 |

OTHER PUBLICATIONS

Jonathan C. Hardwick, "An Efficient Implementation of Nested Data Parallelism for Irregular Divide-and-Conquer Algorithms," First International Workshop on High-Level Programming Models and Supportive Environments, Apr. 1996.

Guy E. Blelloch, Jonathan C. Hardwick, Jay Sipelstein, Marco Zagha, and Siddhartha Chatterjee, "Implementation of a Portable Nested Data-Parallel Language," *Journal of Parallel and Distributed Computing*, vol. 21, pp. 4–14, 1994.

Stephen T. Barnard, "PMRSB: Parallel Multilevel Recursive Spectral Bisection," Proceedings of Supercomputing, 1995.

Eugene D. Brooks III, "PCP: A Paradigm Which Spans Uniprocessor, SMP and MPP Architectures," SC '95 Poster Presentation, Jun. 14, 1995.

(List continued on next page.)

Primary Examiner—Majid A. Banankhah
(74) Attorney, Agent, or Firm—Klarquist Sparkman Campbell Leigh & Whinston

(57) ABSTRACT

A parallel programming system implements dynamic load balancing to distribute processing workload to available processors in a parallel computer. A preprocessor in the system converts a nested parallel program into sequential code executable on processors of the parallel computer and calls to a message passing interface for inter-processor communication among the processors. When processing a nested parallel program, the preprocessor inserts a test function to evaluate the computational cost of a function call. At runtime, processors evaluate the test function to determine whether to ship a function call to another processor. This approach enables processors to offload function calls to other available processors in cases where it is more efficient to incur the cost of shipping the function call and receiving the results than it is to process the function call on the original processor.

13 Claims, 11 Drawing Sheets

OTHER PUBLICATIONS

Soumen Chakrabarti, James Demmel, Katherine Yelick, "Modeling the Benefits of Mixed Data and Task Parallelism," In Proceedings of the 7$^{th}$ Annual ACM Symposium on Parallel Algorithms and Architectures, Jul. 1995.

Tom Axford, "The Divide–and–Conquer Paradigm as a Basis for Parallel Language Design," *Advances in Parallel Algorithms*, Blackwell, 1992.

Thomas J. Sheffler and Siddhartha Chatterjee, "An Object–Oriented Approach to Nested Data Parallelism," In Proceedings of the 5$^{th}$ Symposium on the Frontiers of Massively Parallel Computation, IEEE, Feb., 1995.

Daniel W. Palmer, Jan F. Prins and Stephen Westfold, "Work–Efficient Nested Data–Parallelism," In Proceedings of the 5$^{th}$ Symposium on the Frontiers of Massively Parallel Computation, IEEE, pp. 186–193, Feb., 1995.

Manuel M.T. Chakravarty, Friedrich Wilhelm Schröer, Martin Simons, "V–Nested Parallelism in C," In Proceedings of the Working Conference on Massively Parallel Programming Models, IEEE, Computer Society Press, 1995.

Jay Sipelstein, "Data Representation Optimizations for Collection–Oriented Languages," Ph.D. Thesis Proposal, Ver. 1.0, for School of Computer Science, Carnegie Mellon University, May 12, 1992.

Robert C. Miller, "A Type–checking Preprocessor for Cilk 2, a Multithreaded C Language," Thesis for Department of Electrical Engineering and Computer Science for Massachusetts Institute of Technology, May, 1995.

Jonathan Richard Shewchuck, "Triangle: Engineering a 2D Quality Mesh Generator and Delaunay Triangulator,"In *First Workshop on Applied Computational Geometry*, pp. 124–133, ACM, May, 1996.

Guy E. Blelloch, Gary L . Miller, Dafna Talmor, "Developing a Practical Projection–Based Parallel Delaunay Algorithm," In Proceedings of the 12$^{th}$ Annual Symposium on Computational Geometry, ACM, May, 1996.

Timothy M. Y. Chan, Jack Snoeyink, Chee–Keng Yong, "Output–Sensitive Construction of Polytopes in Four Dimensions and Clipped Voronoi Diagrams in Three," In Proceedings of the 6$^{th}$ Annual ACM–SIAM Symnposium on Discrete Algorithms, pp. 282–291, 1995.

Blelloch et al., "Vcode: A Data–Parallel Intermediate Language," Proceedings of the 3$^{rd}$ Symposium on the Frontiers of Massively Parallel Computation, pp. 471–480, Oct. 8–10, 1990.

Sipelstein et al., "Collection–Oriented Language," Proceedings of the IEEE, vol. 79, Issue 4, pp. 504–523, Apr. 1991.

Hardwick, J.C., "Porting a Vector Library: A Comparison of MPI, Paris, CMMD and PVM, "Proceedings of the 1994 Scalable Parallel Libraries Conference, pp. 68–77, Oct. 12-14, 1994.

Blelloch et al., "Parallelism in Sequential Functional Languages,"Proceedings of the Seventh International Conference On Functional Programming Languages and Computer Architecture, pp. 226–237, Jun. 26–28, 1995.

Bruce Jay Nelson, "Remote Procedure Call," Dissertation for Ph.D., Computer Science Department, Carnegie–Mellon University, Pittsburgh, PA, May 3, 1981.

DYNAMIC LOAD BALANCING AMONG PROCESSORS IN A PARALLEL COMPUTER

RELATED APPLICATION DATA

This application claims priority to co-pending U.S. provisional patent application serial No. 60/085,320, filed on May 13, 1998, which is hereby incorporated by reference. This patent application is related to the following co-pending applications filed concurrently herewith by Jonathan C. Hardwick:

1. A Nested Parallel Language Preprocessor For Converting Parallel Language Programs Into Sequential Code.
2. Nested Parallel 2D Delaunay Triangulation Method.
3. Parallel Processing Method And System Using A Lazy Parallel Data Type To Reduce Inter-Processor Communication.

FIELD OF THE INVENTION

The invention relates to parallel processing on distributed memory and shared memory parallel computers having multiple processors.

BACKGROUND OF THE INVENTION

It is hard to program parallel computers. Dealing with many processors at the same time, either explicitly or implicitly, makes parallel programs harder to design, analyze, build, and evaluate than their serial counterparts. However, using a fast serial computer to avoid the problems of parallelism is often not enough. There are always problems that are too big, too complex, or whose results are needed too soon.

Ideally, a parallel programming model or language should provide the same advantages we seek in serial languages: portability, efficiency, and ease of expression. However, it is typically impractical to extract parallelism from sequential languages. In addition, previous parallel languages have generally ignored the issue of nested parallelism, where the programmer exposes multiple simultaneous sources of parallelism in an algorithm. Supporting nested parallelism is particularly important for irregular algorithms, which operate on non-uniform data structures (for example, sparse arrays, trees and graphs).

Parallel Languages and Computing Models

The wide range of parallel architectures make it difficult to create a parallel computing model that is portable and efficient across a variety of architectures. Despite shifts in market share and the demise of some manufacturers, users can still choose between tightly-coupled shared-memory multiprocessors such as the SGI Power Challenge, more loosely coupled distributed-memory multicomputers such as the IBM SP2, massively-parallel SIMD machines such as the MasPar MP-2, vector supercomputers such as the Cray C90, and loosely coupled clusters of workstations such as the DEC SuperCluster. Network topologies are equally diverse, including 2D and 3D meshes on the Intel Paragon and ASCI Red machine, 3D tori on the Cray T3D and T3E, butterfly networks on the IBM SP2, fat trees on the Meiko CS-2, and hypercube networks on the SGI Origin2000. With extra design axes to specify, parallel computers show a much wider range of design choices than do serial machines, with each choosing a different set of tradeoffs in terms of cost, peak processor performance, memory bandwidth, interconnection technology and topology, and programming software.

This tremendous range of parallel architectures has spawned a similar variety of theoretical computational models. Most of these are variants of the original CRCW PRAM model (Concurrent-Read Concurrent-Write Parallel Random Access Machine), and are based on the observation that although the CRCW PRAM is probably the most popular theoretical model amongst parallel algorithm designers, it is also the least likely to ever be efficiently implemented on a real parallel machine. That is, it is easily and efficiently portable to no parallel machines, since it places more demands on the memory system in terms of access costs and capabilities than can be economically supplied by current hardware. The variants handicap the ideal PRAM to resemble a more realistic parallel machine, resulting in the locality-preserving H-PRAM, and various asynchronous, exclusive access, and queued PRAMs. However, none of these models have been widely accepted or implemented.

Parallel models which proceed from machine characteristics and then abstract away details—that is, "bottom-up" designs rather than "top-down"—have been considerably more successful, but tend to be specialized to a particular architectural style. For example, LogP is a low-level model for message-passing machines, while BSP defines a somewhat higher-level model in terms of alternating phases of asynchronous computation and synchronizing communication between processors. Both of these models try to accurately characterize the performance of any message-passing network using just a few parameters, in order to allow a programmer to reason about and predict the behavior of their programs.

However, the two most successful recent ways of expressing parallel programs have been those which are arguably not models at all, being defined purely in terms of a particular language or library, with no higher-level abstractions. Both High Performance Fortran and the Message Passing Interface have been created by committees and specified as standards with substantial input from industry, which has helped their widespread adoption. HPF is a full language that extends sequential Fortran with predefined parallel operations and parallel array layout directives. It is typically used for computationally intensive algorithms that can be expressed in terms of dense arrays. By contrast, MPI is defined only as a library to be used in conjunction with an existing sequential language. It provides a standard message-passing model, and is a superset of previous commercial products and research projects such as PVM and NX. Note that MPI is programmed in a control-parallel style, expressing parallelism through multiple paths of control, whereas HPF uses a data-parallel style, calling parallel operations from a single thread of control.

Nested and Irregular Parallelism

Neither HPF or MPI provide direct support for nested parallelism or irregular algorithms. For example, consider the quicksort algorithm set forth below. The irregularity comes from the fact that the two subproblems that quicksort creates are typically not of the same size; that is, the divide-and-conquer algorithm is unbalanced.

procedure QUICKSORT(S):
  if S contains at most one element
  then
    return S
  else
    begin
      choose an element a randomly from S;
      let $S_1$, $S_2$ and $S_3$ be the sequences of elements in S less than, equal to, and greater than α, respectively;
return (QUICKSORT($S_1$) followed by $S_2$ followed by QUICKSORT($S_3$))
end Although it was originally written to describe a serial algorithm, the pseudocode shown above contains both data-parallel and control-parallel operations. Comparing the elements of the sequence S to the pivot element α, and selecting the elements for the new subsequences $S_1$, $S_2$, and $S_3$ are inherently data-parallel operations. Meanwhile, recursing on $S_1$ and $S_3$ can be implemented as a control-parallel operation by performing two recursive calls in parallel on two different processors.

Note that a simple data-parallel quicksort (such as one written in HPF) cannot exploit the control parallelism that is available in this algorithm, while a simple control-parallel quicksort (such as one written in a sequential language and MPI) cannot exploit the data parallelism that is available. For example, a simple control-parallel divide-and-conquer implementation would initially put the entire problem onto a single processor, leaving the rest of the processors unused. At the first divide step, one of the subproblems would be passed to another processor. At the second divide step, a total of four processors would be involved, and so on. The parallelism achieved by this algorithm is proportional to the number of threads of control, which is greatest at the end of the algorithm. By contrast, a data-parallel divide-and-conquer quicksort would serialize the recursive applications of the function, executing one at a time over all of the processors. The parallelism achieved by this algorithm is proportional to the size of the subproblem being operated on at any instant, which is greatest at the beginning of the algorithm. Towards the end of the algorithm there will be fewer data elements in a particular function application than there are processors, and so some processors will remain idle.

By simultaneously exposing both nested sources of parallelism, a nested parallel implementation of quicksort can achieve parallelism proportional to the total data size throughout the algorithm, rather than only achieving full parallelism at either the beginning (in data parallelism) or the end (in control parallelism) of the algorithm. The benefits of a nested parallel implementation are illustrated in more detail in Hardwick, Jonathan, C., Practical Parallel Divide-and-Conquer Algorithms, PhD Thesis, Carnegie Mellon University, December 1997, CMU-CS-97-197.

Divide-and-Conquer Algorithms

Divide-and-conquer algorithms solve a problem by splitting it into smaller, easier-to-solve parts, solving the subproblems, and then combining the results of the subproblems into a result for the overall problem. The subproblems typically have the same nature as the overall problem (for example, sorting a list of numbers), and hence can be solved by a recursive application of the same algorithm. A base case is needed to terminate the recursion. Note that a divide-and-conquer algorithm is inherently dynamic, in that we do not know all of the subtasks in advance.

Divide-and-conquer has been taught and studied extensively as a programming paradigm, and can be found in any algorithm textbook. In addition, many of the most efficient and widely used computer algorithms are divide-and-conquer in nature. Examples from various fields of computer science include algorithms for sorting, such as merge-sort and quicksort, for computational geometry problems such as convex hull and closest pair, for graph theory problems such as traveling salesman and separators for VLSI layout, and for numerical problems such as matrix multiplication and fast Fourier transforms.

The subproblems that are generated by a divide-and-conquer algorithm can typically be solved independently. This independence allows the subproblems to be solved simultaneously, and hence divide-and-conquer algorithms have long been recognized as possessing a potential source of control parallelism. Additionally, all of the previously described algorithms can be implemented in terms of data-parallel operations over collection-oriented data types such as sets or sequences, and hence, data parallelism can be exploited in their implementation. However, there is still a need to define a model in which to express this parallelism. Previous models have included fork-join parallelism, and the use of processor groups, but both of these models have severe limitations. In the fork-join model available parallelism and the maximum problem size is greatly limited, while group-parallel languages have been limited in their portability, performance, and/or ability to handle irregular divide-and-conquer algorithms.

SUMMARY OF THE INVENTION

The invention provides a method and system for performing dynamic load balancing of the processing workload among processors in parallel computers. The invention is used to improve the efficiency of programs that have functions capable of being executed in parallel on the processors of a parallel computer. The dynamic load balancing method distributes processing workload by evaluating the computational cost of a function call at runtime and determining whether or not to ship the call to another processor. Before invoking a function call, a processor of the parallel computer determines whether the computational cost of the function call exceeds a threshold. If so, it determines whether another processor is available to process the function call. If another processor is available, the processor seeking help ships the arguments of the call to the available processor and receives the results. In the meantime, the requesting processor continues processing another function call.

The invention is implemented in a parallel programming system based on a nested parallel programming model called the team parallel model. This system supports a nested parallel language that can be used to implement irregular divide-and-conquer programs on parallel computers. Significant aspects of the team parallel model include: 1) recursive subdivision of the processors of a parallel machine into asynchronous processor teams to match the runtime behavior of a recursive divide-and-conquer algorithm, where the number of processors in each team are selected based on computational cost of each recursive function call; 2) switching to efficient serial code (either user supplied or converted from the parallel code by a preprocessor/coinpiler) when the subdivision reaches a single processor; 3) a collection oriented data type that supports data parallel operations within processor teams; and 4) dynamic load balancing of the processing workload among processors.

The implementation of the team parallel approach uses dynamic load balancing when processing switches to serial code. In the implementation of the team parallel model, a processor sends a function call to an idle processor when the computational cost of the function call exceeds a threshold. Specifically in one implementation, one of the processors in a group executing a parallel program acts as a manager and dynamically manages a handshaking process between a processor requesting help and an idle processor available to assist the requesting processor.

The computational cost of a function call can be evaluated at run-time using a test function that returns an estimate of the function's complexity. A preprocessor in the team parallel system sets up this runtime evaluation. The preprocessor converts a program written in a nested parallel language into sequential code and calls to a message passing interface. When it generates the sequential code and message passing calls, the preprocessor inserts the test function in the code. When processing proceeds to a point where a processor can seek help from another processor, the processor executes the test function and evaluates the computational cost. The threshold for determining whether to send a function call to another processor takes into account the communication time involved in sending the function call and its arguments, and receiving the results.

While the invention is implemented in a nested parallel processing system, it is also possible to implement it in other parallel processing systems where the processing workload is distributed among the processors in a parallel computer.

DETAILED DESCRIPTION

Figure 1:
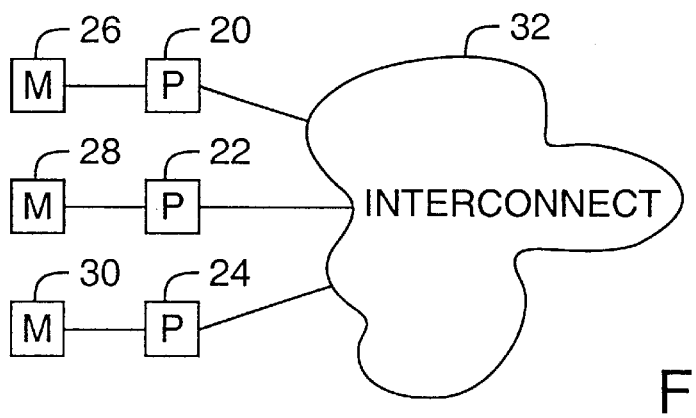
FIG. 1 is a block diagram illustrating a parallel computer in which the memory is physically and logically distributed.

1. Introduction
1.1 The Team Parallel Model

The team parallel model uses data parallelism within teams of processors acting in a control-parallel manner. The basic data structures are distributed across the processors of a team, and are accessible via data-parallel primitives. The divide stage of a divide-and-conquer algorithm is then implemented by dividing the current team of processors into two or more subteams, distributing the relevant data structures between them, and then recursing independently within each subteam. This natural mixing of data parallelism and control parallelism allows the team parallel model to easily handle nested parallelism.

There are three important additions to this basic approach. First, in the case when the algorithm is unbalanced, the subteams of processors may not be equally sized—that is, the division may not always be into equal pieces. In this case, the team approach chooses the sizes of the subteams in relation to the cost of their subtasks. However, this passive load-balancing method is often not enough, because the number of processors is typically much smaller than the problem size, and hence granularity effects mean that some processors will end up with an unfair share of the problem when the teams have recursed down to the point where each consists of a single processor. Thus, the second important addition is an active load-balancing system. The approach described here uses function-shipping to farm out computation to idle processors. This can be seen as a form of remote procedure call. Finally, when the team consists of a single processor that processor can use efficient sequential code, either by calling a version of the parallel algorithm compiled for a single processor or by using a completely different sequential algorithm supplied by the programmer.

1.2 Overview of the Components of an Implementation

Machiavelli is a particular implementation of the team parallel model. It is presented as an extension to the C programming language, although any sequential programming language could be used. The basic data-parallel data structure is a vector, which is distributed across all the processors of the current team. Vectors can be formed from any of the basic C datatypes, and from any user-defined datatypes. Machiavelli supplies a variety of basic parallel operations that can be applied to vectors (scans, reductions, permutations, appends, etc), and in addition allows the user to construct simple data-parallel operations of their own. A special syntax is used to denote recursion in a divide-and-conquer algorithm.

Machiavelli is implemented using a preprocessor that translates the language extensions into C plus calls to MPI. The use of MPI ensures the greatest possible portability across both distributed-memory machines and shared-memory machines, but again, any other method of communicating between processors could be used, such as PVM. Data-parallel operations in Machiavelli are translated into loops over sections of a vector local to each processor; more complex parallel operations use MPI function calls in addition to local operations. The recursion syntax is translated into code that computes team sizes, subdivides the processors into teams, redistributes the arguments to the appropriate subteams, and then recurses in a smaller team. User-defined datatypes are automatically mapped into MPI datatypes, allowing them to be used in any Machiavelli operation (for example, sending a vector of user-defined point structures instead of sending two vectors of x and y coordinates). This also allows function arguments and results to be transmitted between processors, allowing the use of a function-shippingactive load-balancing system. Additionally, Machiavelli supports both serial compilation of parallel functions (removing the MPI constructs), and the overriding of these default functions with user-defined serial functions that can implement a more efficient algorithm.

Though Machiavelli's preprocessor converts nested parallel programs into C language code and calls to MPI, it is also possible to implement a preprocessor for the team parallel model to convert a nested parallel language into other well known sequential, imperative programming languages. In general, imperative programming code is comprised of a list of program statements that tell a processor which operations to perform on specified data stored in a computer's memory. Imperative programming code specifies the flow of control through program statements executed in a sequential order. Imperative programming languages typically provide abstractions of the processor's instruction set and memory to hide the details of specific machine instructions and memory usage from the programmer. For instance, an imperative language supplies data types as an abstraction of the data in memory. An imperative language also supplies operators that enable the programmer to create expressions or program statements as an abstraction for the instructions of the processor.

Some examples of imperative programming languages include C++, Java, FORTRAN, Ada, Pascal, Modula-2, etc. The preprocessor may be implemented to convert a nested parallel program to code in a variety of known sequential programming languages, whether they strictly follow the imperative programming model or not. For instance, many object-oriented languages such as C++ are at least in part based on an imperative programming model. Thus, it is possible to design the preprocessor for an object-oriented language as well.

2. Overview of Parallel Computers

The team parallel model is designed to be implemented on a MIMD (multiple instruction, multiple data) architecture. Since a MIMD architecture is a very general parallel architecture, encompassing a wide variety of parallel machines, the team parallel model is portable across a wide variety of parallel processing computers, including both distributed memory and shared memory machines.

To illustrate the broad scope of the MIMD architecture, consider the alternative parallel architecture called SIMD (Single Instruction Multiple Data). In a SIMD architecture, the parallel processors each execute a single instruction stream on their own part of the data. The processors operate in parallel by simultaneously executing the same instruction stream. The processors operate synchronously such that each one is in lock step with the others. Finally, the data of the single instruction stream is spread across the processors such that each operates on its own part of the data. In contrast, the processors in a MIMD architecture execute independently on potentially distinct instruction streams.

In terms of the physical and logical organization of memory, a MIMD architecture encompasses three classes of parallel computers: 1) parallel computers for which memory is physically and logically distributed; 2) parallel computers for which memory is physically distributed and logically shared; and 3) parallel computers for which memory is physically and logically shared. The implementation of the team parallel model assumes a parallel architecture with distributed memory. Since a distributed memory implementation can be executed in a shared memory architecture, the implementation applies to both distributed and shared memory architectures.

Figure 3:
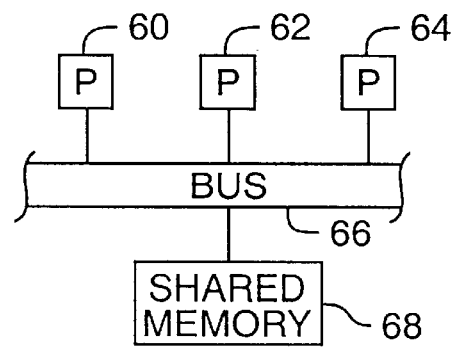
FIG. 3 is a block diagram illustrating a parallel computer in which the memory is physically and logically shared.
Figure 2:
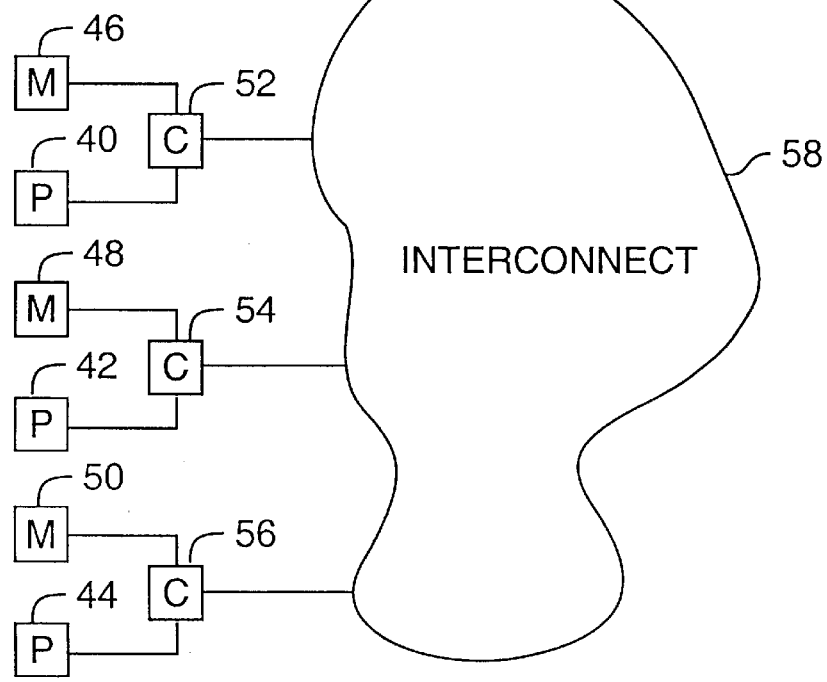
FIG. 2 is a block diagram illustrating a parallel computer in which the memory is physically distributed and logically shared.

FIGS. 1–3 illustrate examples of three parallel computing architectures. FIG. 1 is a block diagram illustrating a distributed memory computer in which the memory is physically and logically distributed. This distributed memory architecture includes a number of processors 20, 22, 24, each with a corresponding memory 26, 28, 30. The processors execute code and operate on data stored in their respective memories. To communicate, the processors pass messages to each other via the interconnect 32. The interconnect may be a custom switch, such as a crossbar, or a commodity network, such as FDDI, ATM, or Ethernet. Examples of this type of parallel computer include the Alpha Cluster from Digital Equipment Corporation and the SP2 from IBM Corporation. The Alpha Cluster is comprised of Alpha workstations interconnected via a FDDI switch. The SP2 is a supercomputer comprised of RS workstations interconnected via an SP2 switch from IBM.

FIG. 2 is a block diagram illustrating a distributed memory computer in which the memory is physically distributed, yet logically shared. The memory is logically shared in the sense that each processor can access another processor's memory without involving that processor. Like the distributed memory architecture of FIG. 1, this architecture includes a number of processors 40, 42, 44, each with a corresponding memory 46, 48, 50. However, the processor-memory nodes are interconnected via a controller (e.g., 52, 54, 56) that enables each processor to access another's memory directly. Each of the processor-memory nodes are interconnected via an interconnect 58. An example of this type of parallel computer is a Cray T3D, which is comprised of Alpha nodes interconnected with a T3D interconnect that supports a form of logical shared memory access called SHMEM.

FIG. 3 is a block diagram illustrating an example of a shared memory architecture in which the memory is physically and logically shared. In this type of architecture, the processors 60, 62, 64 are interconnected via a bus 66. Each of the processors can access each other's data in the shared memory 68. An example of this type of computer is an SGI Challenge from Silicon Graphics Incorporated.

In general, the team-parallel model assumes that we have many more items of data than processors—that is, N>>P. The model also assumes that it is many times faster for a processor to perform a computation using local registers than it is to read or write a word to or from local memory, which in turn is many times faster than initiating communication to a different processor.

The Machiavelli language is designed to be easily portable to all of the architectures shown in FIGS. 1–3. The Machiavelli preprocessor converts program code written in the team parallel style into C and MPI functions. Since MPI is implemented on each of the architectures of FIGS. 1–3, Machiavelli is easily portable to all of them. In each of the architectures, the underlying implementation of the MPI functions may differ, but this is of no concern since a Machiavelli program uses the MPI implementation of the specific architecture to which is compiled. In the Cray T3D, for example, the MPI implementation is based on the SHMEM interface library. In the IBM SP2, the MPI implementation is based on the IBM MPL library. While Machiavelli is specifically based on MPI, it is possible to use other message passing libraries. One alternative, for example, is the PVM message passing library.

3. The Divide and Conquer Programming Strategy 3.1 Overview of Divide and Conquer Programs A divide-and-conquer programming strategy solves a large instance of a problem by breaking it into smaller instances of the same problem, and using the solutions of these to solve the original problem. This strategy is a variant of the more general top-down programming strategy, but is distinguished by the fact that the subproblems are instances of the same problem. Divide-and-conquer algorithms can therefore be expressed recursively, applying the same algorithm to the subproblems as to the original problem. As with any recursive algorithm, a divide-and-conquer problem needs a base case to terminate the recursion. Typically this base case tests whether the problem is small enough to be solved by a direct method. For example, in quicksort the base case is reached when there are 0 or 1 elements in the list. At this point the list is sorted, so to solve the problem at the base case, the algorithm just returns the input list.

Apart from the base case, a divide-and-conquer problem also needs a divide phase, to break the problem up into subproblems, and a combine phase, to combine the solutions of the subproblems into a solution to the original problem.

As an example, quicksort's divide phase breaks the original list into three lists—containing elements less than, equal to, and greater than the pivot—and its combine phase appends the two sorted subsolutions on either side of the list containing equal elements.

This structure of a base case, direct solver, divide phase, and combine phase can be generalized into a template (or skeleton) for divide-and-conquer algorithms. Pseudocode for such a template is shown in the pseudocode listing below. The literature contains many variations of this basic template.

```
function d and c (p)
  if basecase (p)
  then
    return solve (p)
  else
    (P_1, . . . P_n)=divide (p)
    return combine (d_and_c (p_1), . . . , d_and_c (p_n))
  endif
```

Using this basic template as a reference, there are now several axes along which to differentiate divide-and-conquer algorithms, and in particular their implementation on parallel architectures. Sections 3.1.1 to 3.1.8 will describe these axes. Four of these axes—branching factor, balance, data-dependence of divide function, and sequentiality—have been previously described in the theoretical literature. However, the remaining three—data parallelism, embarrassing divisibility, and data-dependence of size function—have not been widely discussed, although they are important from an implementation perspective.

3.1.1 Branching Factor

The branching factor of a divide-and-conquer algorithm is the number of subproblems into which a problem is divided. This is the most obvious way of classifying divide-and-conquer algorithms, and has also been referred to as the degree of recursion. For true divide-and-conquer algorithms the branching factor must be two or more, since otherwise the problem is not being divided.

3.1.2 Balance

A divide-and-conquer algorithm is balanced if it divides the initial problem into equally-sized subproblems. This has typically been defined only for the case where the sizes of the subproblems sum to the size of the initial problem, for example in a binary divide-and-conquer algorithm dividing a problem of size N into two subproblems of size N/2.

3.1.3 Near Balance

A particular instantiation of a balanced divide-and-conquer algorithm is near-balanced if it cannot be mapped in a balanced fashion onto the underlying machine at run time. Near-balance is another argument for supporting some form of load balancing, as it can occur even in a balanced divide-and-conquer algorithm. This can happen for two reasons. The first is that the problem size is not a multiple of a power of the branching factor of the algorithm. For example, a near-balanced problem of size 17 would be divided into subproblems of sizes 9 and 8 by a binary divide-and-conquer algorithm. At worst, balanced models with no load-balancing must pad their inputs to the next higher power of the branching factor (i.e., to 32 in this case). This can result in a slowdown of at most the branching factor.

The second reason is that, even if the input is padded to the correct length, it may not be possible to evenly map the tree structure of the algorithm onto the underlying processors. For example, in the absence of load-balancing a balanced binary divide-and-conquer problem on a twelve-processor SGI Power Challenge could efficiently use at most eight of the processors. Again, this can result in a slowdown of at most the branching factor.

3.1.4 Embarrassing Divisibility

A balanced divide-and-conquer algorithm is embarrassingly divisible if the divide step can be performed in constant time. This is the most restrictive form of a balanced divide-and-conquer algorithm, and is a divide-and-conquer case of the class of "embarassingly parallel" problems in which no (or very little) inter-processor communication is necessary. In practice, embarassingly divisible algorithms are those in which the problem can be treated immediately as two or more subproblems, and hence no extra data movement is necessary in the divide step. For the particular case of an embarrassingly divisible binary divide-and-conquer algorithm, Kumaran and Quinn coined the term left-right algorithm (since the initial input data is merely treated as left and right halves) and restricted their model to this class of algorithms (See Santhosh Kumaran and Michael J. Quinn, Divide-and-conquer programming on MIMD computers. In *Proceedings of the 9$^{th}$ International Parallel Processing Symposium*, pages 734–741. IEEE, April 1995). Examples of embarassingly divisible algorithms include dot product and matrix multiplication of balanced matrices.

3.1.5 Data Dependence of Divide Function

A divide-and-conquer algorithm has a data-dependent divide function if the relative sizes of subproblems are dependent in some way on the input data. This subclass accounts for the bulk of unbalanced divide-and-conquer algorithms. For example, a quicksort algorithm can choose an arbitrary pivot element with which to partition the problem into subproblems, resulting in an unbalanced algorithm with a data-dependent divide function. Alternatively, it can use the median element, resulting in a balanced algorithm with a divide function that is independent of the data.

3.1.6 Data Dependence of Size Function

An unbalanced divide-and-conquer algorithm has a data-dependent size function if the total size of the subproblems is dependent in some way on the input data. This definition should be contrasted with that of the data-dependent divide function. in which the total amount of data at a particular level is fixed, but its partitioning is not. This category includes algorithms that either add or discards elements based on the input data. In practice, algorithms that discard data, in an effort to further prune the problem size are more common.

3.1.7 Control Parallelism or Sequentiality

A divide-and-conquer algorithm is sequential if the subproblems must be executed in a certain order. Ordering occurs when the result of one subtask is needed for the computation of another subtask. The ordering of subproblems in sequential divide-and-conquer algorithms eliminates the possibility of achieving control parallelism through executing two or more subtasks at once, and hence, any speed-up must be achieved through data parallelism.

3.1.8 Data parallelism

A divide-and-conquer algorithm is data parallel if the test, divide, and combine operations do not contain any serial bottlenecks. As well as the control parallelism inherent in the recursive step, it is also advantageous to exploit data parallelism in the test, divide and combine phases. Again, if this parallelism is not present, the possible speedup of the algorithm is severely restricted. Data parallelism is almost always present in the divide stage, since division is typically structure-based (for example, the two halves of a matrix in matrix multiplication) or value-based (for example, elements less than and greater than the pivot in quicksort), both of which can be trivially implemented in a data-parallel fashion.

4. Implementation of Team Approach

4.1 Overview of Implementation

Team parallelism is designed to support all of the characteristics of the divide-and-conquer algorithms discussed in section 3. There are four main features of the team parallel model:

1. Asynchronous subdividable teams of processors.
2. A collection-oriented data type supporting data-parallel operations within teams.
3. Efficient serial code executing on single processors.
4. An active load-balancing system.

By combining all of the features, the team parallel model can be used to develop efficient implementations of a wide range of divide-and-conquer algorithms, including both balanced and unbalanced examples. The next sections define each of these features and their relevance to divide-and-conquer algorithms, and discuss their implications, concentrating in particular on message-passing distributed memory machines.

4.1.1 Teams of Processors

As its name suggests, team parallelism uses teams of processors. These are independent and distinct subsets of processors. Teams can divide into two or more subteams, and merge with sibling subteams to reform their original parent team. This matches the behavior of a divide-and-conquer algorithm, with one subproblem being assigned per subteam.

Sibling teams run asynchronously with respect to each other, with no communication or synchronization involved. This matches the independence of recursive calls in a divide-and-conquer algorithm. Communication between teams happens only when teams are split or merged.

The use of smaller and smaller teams has performance advantages for implementations of team parallelism. First, assuming that the subdivision of teams is done on a locality-preserving basis, the smaller subteams will have greater network locality than their parent team. For most interconnection network topologies, more bisection bandwidth is available in smaller subsections of the network than is available across the network as a whole, and latency may also be lower due to fewer hops between processors. For example, achievable point-to-point bandwidth on the IBM SP2 falls from 34 MB/s on 8 processors, to 24 MB/s on 32 processors, and to 22 MB/s on 64 processors (See William Gropp, Tuning MPI program for peak performance. http://www.mcs.anl.gov/mpi/tutorials/perf/, 1996). Also, collective communication constructs in a message-passing layer typically also have a dependency on the number of processors involved. For example, barriers, reductions and scans are typically implemented as a virtual tree of processors, resulting in a latency of O(log P), while the latency of all-to-all communication constructs has a term proportional to P, corresponding to the point-to-point messages on which the construct is built.

In addition, the fact that the teams run asynchronously with respect to one another can reduce peak inter-processor bandwidth requirements. If the teams were to operate synchronously with each other, as well as within themselves, then data-parallel operations would execute in lockstep across all processors. For operations involving communication, this would result in total bandwidth requirements proportional to the total number of processors. However, if the teams run asynchronously with respect to each other, and are operating on an unbalanced algorithm, then it is less likely that all of the teams will be executing a data-parallel operation involving communication at the same instant in time. This is particularly important on machines where the network is a single shared resource, such as a bus on a shared-memory machine.

Since there is no communication or synchronization between teams, all data that is required for a particular function call of a divide-and-conquer algorithm must be transferred to the appropriate subteam before execution can begin. Thus, the division of processors among subteams is also accompanied by a redistribution of data among processors. This is a specialization of the general team-parallel model to the case of message-passing machines, since on a shared-memory machine no redistribution would be necessary.

The choice of how to balance workload across processors (in this case, choosing the subteams such that the time for subsequent data-parallel operations within each team is minimized) while minimizing interprocessor communication (in this case, choosing the subteams such that the minimum time is spent redistributing data) has been proven to be NP-complete Therefore, most realistic systems use heuristics. For divide-and-conquer algorithms, simply maximizing the network locality of processors within subteams is a reasonable choice, even at the cost of increased time to redistribute the subteams. The intuitive reason is that the locality of a team will in turn affect the locality of all future subteams that it creates, and this network locality will affect both the time for subsequent data-parallel operations and the time for redistributing data between future subteams.

4.1.2 Collection-oriented Data Type

Within a team, computation is performed in a data-parallel fashion, thereby supporting any parallelism present in the test, divide and merge phases of a divide-and-conquer algorithm. Conceptually, this can be thought of as strictly synchronous with all processors executing in lockstep, although in practice this is not required of the implementation. An implementation of the team-parallel programming model must therefore supply a collection-oriented distributed data type, and a set of data-parallel operations operating, on this data type that are capable of expressing the most common forms of divide and merge operations.

The Machiavelli implementation of the team parallel model use vectors (one-dimensional arrays) as the primary distributed data type, since these have well-established semantics and are appropriate for many divide-and-conquer algorithms. I lowever, other collection-oriented data types may be used as well.

The implementation also assumes the existence of at least the following collective communication operations, which operate within the context of a team of p processors:

Barrier No processor can continue past a barrier until all processors have arrived at it.

Broadcast One processor broadcasts mi elements of data to all other processors.

Reduce Given an associative binary operator $\oplus$ and m elements of data on each processor, return to all processors m results. The $i^{th}$ result is computed by combining the ith element on each processor using $\oplus$.

Scan Given an associative binary operator $\otimes$ and m elements of data on each processor, return to all processors m results. The ith result on processor j is computed by combining the $i^{th}$ element from the first j−1 processors using $\otimes$. This is also known as the "parallel prefix" operation.

Gather Given m elements of data on each processor, return to all processors the total of m×p elements of data.

All-to-all communication Given m×p elements of data on each processor, exchange m elements with every other processor.

Personalized all-to-all communication Exchange an arbitrary number of elements with every other processor.

All of these can be constructed from simple point-to-point sends and receives on a message-passing machine. However, their abstraction as high level operations exposes many more opportunities for architecture-specific optimizations. Recent communication libraries, such as MPI and BSPLib, have selected a similar set of primitives, strengthening the claim that these are a necessary and sufficient set of collective communication operations.

4.1.3 Efficient Serial Code

In the team parallel model, when a team of processors running data-parallel code has recursed down to the point at which the team only contains a single processor, it switches to a serial implementation of the program. At this point, all of the parallel constructs reduce to purely local operations. Similarly, the parallel team-splitting operation is replaced by a conventional sequential construct with two (or more) recursive calls. When the recursion has finished, the processors return to the parallel code on their way back up the call tree. Using specialized sequential code is faster than simply running the standard team-parallel code on one processor: even if all parallel calls reduce to null operations (for example, a processor sending a message to itself on a distributed-memory system), the overhead of the function calls can be avoided by removing them completely. Two versions of each function are therefore required: one to run on a team of processors, built on top of parallel communication functions, and a second specialized to run on a single processor, using purely local loops.

This might seem like a minor performance gain, but in the team parallel model, most of the computational time is expected to be spent in sequential code. For a divide-and-conquer problem of size n on P processors, the expected height of the algorithmic tree is log n, while the expected height of our team recursion tree is log P. Since n>>P, the height of the algorithm tree is much greater than that of the recursion tree. Thus, the bulk of the algorithm's time will be spent executing serial code on single processors.

The team parallel model also allows the serial version of the divide-and-conquer algorithm to be replaced by user-supplied serial code. This code may implement the same algorithm using techniques that have the same complexity but lower constants. For example, serial quicksort could be implemented using the standard technique of moving a pointer in from each end of the data, and exchanging items as necessary. Alternatively, the serial version may use a completely different sorting algorithm that has a lower complexity (for example, radix sort).

Allowing the programmer to supply specialized serial code in this way implies that the collection-oriented data types must be accessible from serial code with little performance penalty, in order to allow arguments and results to be passed between the serial and parallel code. For the distributed vector type chosen for Machiavelli, this is particularly easy, since on one processor the block distribution of a vector is represented by a simple C array.

4.1.4 Load Balancing

For unbalanced problems, the relative sizes of the subteams is chosen to approximate the relative work involved in solving the subproblems. This is a simple form of passive load balancing. However, due to the difference in grain size between the problem size and the machine size, it is at best approximate, and a more aggressive form of load balancing must be provided to deal with imbalances that the team approach cannot handle. The particular form of load balancing is left to the implementation, but should be transparent to the programmer.

As a demonstration of why an additional form of load balancing is necessary, consider the following pathological case, where we can show that one processor is left with essentially all of the work.

For simplicity, assume that work complexity of the algorithm being implemented is linear, so that the processor teams are being divided according to the sizes of the subproblems. Consider a divide-and-conquer algorithm on P processors and a problem of size n. The worst case of load balancing occurs when the divide stage results in a division of n−1 elements (or units of work), and 1 element. Assuming that team sizes are rounded up, these two subproblems will be assigned to subteams consisting of P−1 processors and 1 processor, respectively. Now assume that the same thing happens for the subproblem of size n−1 being processed on P−1 processors; it gets divided into subproblems of size n−2 and 1. Taken to its pathological conclusion, in the worst case we have P−1 processors each being assigned 1 unit of work and 1 processor being assigned n+J−P units of work (we also have a very unbalanced recursion tree, of depth P instead of the expected O(log P)). For n>>P, this results in one processor being left with essentially all of the work.

Of course, if we assume n>>P then an efficient implementation should not hand one unit of work to one processor, since the costs of transferring the work and receiving the result would outweigh the cost of just doing the work locally. There is a practical minimum problem size below which it is not worth subdividing a team and transferring a very small problem to a subteam of one processor. Instead, below this grain size it is faster to process the two recursive calls (one very large, and one very small) serially on one team of processors. However, this optimization only reduces the amount of work that a single processor can end up with by a linear factor. For example, if the smallest grain size happens to be half of the work that a processor would expect to do "on average" (that is, n/2P), then by applying the same logic as in the previous paragraph, we can see that P−1 processors will each have n/2P data, and one processor will have the remaining n−(P−1) (n/2P) data, or approximately half of the data.

As noted above, most of the algorithm is spent in serial code, and hence load-balancing efforts should be concentrated there. The Machiavelli implementation uses a function shipping approach to load balancing. This takes advantage of the independence of the recursive calls in a divide-and-conquer algorithm, which allows us to execute one or more of the calls on a different processor, in a manner similar to that of a specialized remote procedure call. As an example, an overloaded processor running serial code in a binary divide-and-conquer algorithm can ship the arguments for one recursive branch of the algorithm to an idle processor, recurse on the second branch, and then wait for the helping processor to return the results of the first branch. If there is more than one idle processor, they can be assigned future recursive calls, either by the original processor or by one of the helping processors. Thus, all of the processors could ultimately be brought into play to load-balance a single function call. The details of determining when a processor is overloaded, and finding an idle processor, depend on the particular implementation.

4.1 Summary

The above sections have defined a team parallel programming model, which is designed to allow the efficient parallel expression of a wider range of divide-and-conquer algorithms than has previously been possible.

Specifically, team parallelism uses teams of processors to match the run-time behavior of divide-and-conquer algorithms, and can fully exploit the data parallelism within a team and the control parallelism between them. The teams are matched to the subproblem sizes and run asynchronously with respect to each other. Most computation is done using serial code on individual processors, which eliminates parallel overheads. Active load-balancing is used to cope with any remaining irregular nature of the problem; a function-shipping approach is sufficient because of the independent nature of the recursive calls to a divide-and-conquer algorithm.

4.2 The Team Parallel System

This section describes the Machiavelli system, an implementation of the team parallel model for distributed-memory parallel machines.

Machiavelli uses vectors as its basic collection-oriented data structure, and employs MPI as its parallelization mechanism. To the user, Machiavelli appears as three main extensions to the C language: the vector data structure and associated functions; a data-parallel construct that allows direct creation of vectors; and a control-parallel construct that expresses the recursion in a divide-and-conquer algorithm. The data-parallel and control-parallel constructs are translated into standard C and calls to the MPI library by a preprocessor.

The remainder of this section is arranged as follows. The next section provides an overview of the Machiavelli system, and the extensions to C that it implements. The following three sections then describe particular extensions and how they are implemented, namely vectors, predefined vector functions, and the data-parallel construct. After that come three sections on implementation details that are generally hidden from the programmer: teams, divide-and-conquer recursion, and load balancing.

4.2.1 Overview of Machiavelli

Perhaps the simplest way to give an overview of Machiavelli is with an example. The following pseudocode shows quicksort written in Machiavelli; compare this to the description of quicksort on page 3.

```
vec_double quicksort (vec_double s)
{
        double pivot;
        vec_double les, eqi, grt, left, right, result;
        if (length (s) < 2) {
          return s;
        } else {
          pivot = get (s, length (s) / 2);
          les = {x : x in s | x < pivot};
          eqi = {x : x in s | x == pivot};
          grt = {x : x in s | x > pivot};
          free (s);
          split (left = quicksort (les.),
                 right = quicksort (grt));
          result = append (left, eqi, right);
          free (left); free (eqi); free (right);
          return result;
        }
}
```

1. The Machiavelli function length (vector) returns the length of a vector. Here it is used both to test for the base case, and to select the middle element of the vector, for use as the pivot.
2. The Machiavelli function get (vector, index) extracts an element of a vector. Here it is used to extract the pivot element.
3. The apply-to-each operator {expr: elt in vec|cond} is used for data-parallel expressions. It is read as "in parallel, for each element elt in the vector vec such that the condition cond holds, return the expression expr".

Here the apply-to-each operator is being used to select out the elements less than, equal to, and greater than the pivot, to form three new vectors.

4. The Machiavelli function, limited by C's type system, is specialized for a particular type (doubles in this case).
5. in Machiavelli, a vector is specified by prepending the name of a type with vec_.
6. In Machiavelli, vectors are explicitly freed as reflected in the free function call.
7. Rather than allowing the application of parallel functions inside an apply-to-all, Machiavelli uses an explicit split syntax to express control parallelism. This is specialized for the recursion in a divide-and-conquer function.

Figure 4:
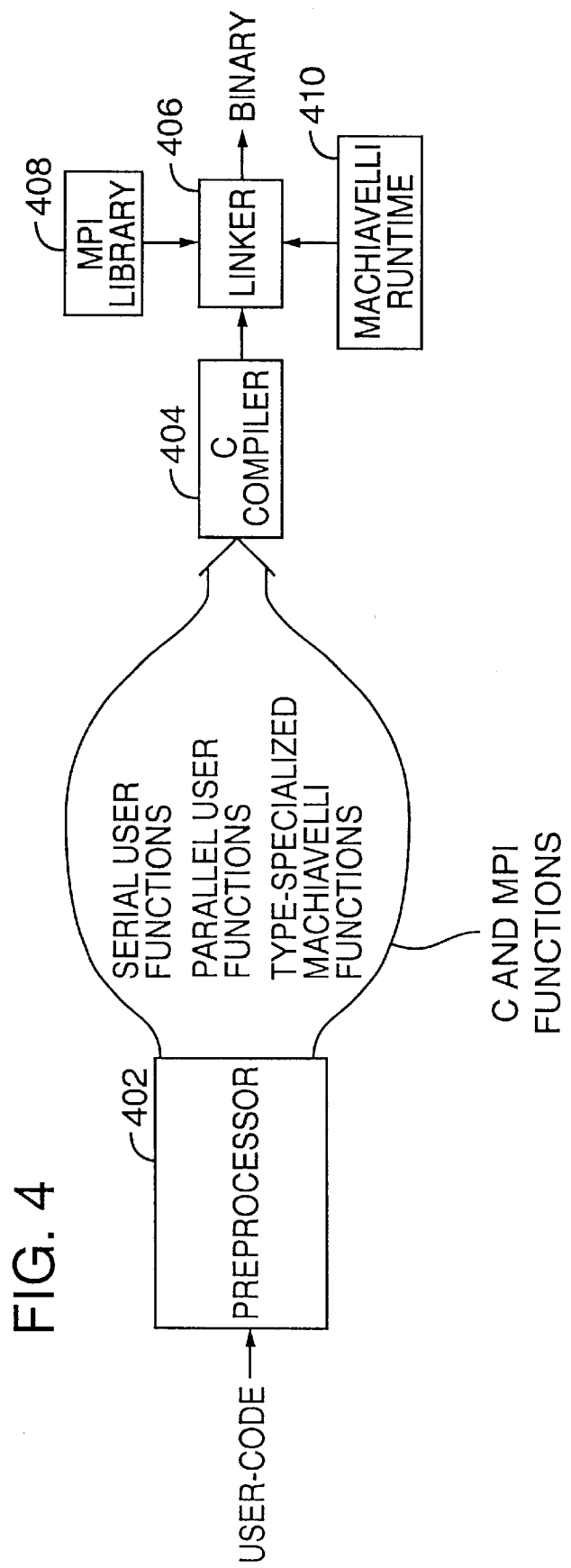
FIG. 4 is a block diagram illustrating the Machiavelli system, an implementation of the team parallel model.

FIG. 4 is a block diagram illustrating the Machiavelli system, an implementation of the team parallel model. To produce efficient code from this syntax, the Machiavelli system uses three main components. First, a preprocessor 402 translates the syntactic extensions into pure C and MPI, and produces a parallel and serial version of each user-defined function. Second, a collection of predefined operations is specialized by the preprocessor for the types supplied by the user at compile time (for example, doubles in the above example). Third, a run-time system handles team operations and load balancing. A standard C compiler 404 compiles the code generated by the preprocessor 402, and a standard linker 406 links the compiled code against an MPI library 408 and the Machiavelli run-time library 410.

In a distributed memory parallel machine, the binary version of the program is loaded into and executed from each node of the machine. Specifically, each processor in the machine executes a version of the program from its associated memory. In a shared memory machine, each processor executes the binary version from shared memory.

4.2.2 Vectors

Machiavelli is built around the vector as its basic data structure. A vector is a dynamically-created ordered collection of values, similar to an array in sequential C, but is distributed across a team of processors. After being declared as a C variable, a vector is created when it is first assigned to. It is then only valid within the creating team. Vectors have reference semantics: thus, assigning one vector to another will result in the second vector sharing the same values as the first. To copy the values an explicit data-parallel operation must be used (see the section on data parallel operations below). A vector is also strongly typed: it cannot be "cast" to a vector of another type. Again, an explicit data-parallel operation must be used to copy and cast the values into a new vector.

Vectors can be created for any of the basic types, and for any types that the user defines. Accessing the fields of vectors of user-defined types is done using the standard C "." operator. For example, given a user-defined type containing floating point fields x and y, and a vector points of such types, a vector of the product of the fields could be computed using:

vec_double products={p.x*p.y:p in points }

A vector is represented on every processor within its team by a structure containing its length, the number of elements that are currently on this processor, a pointer to a block of memory containing those elements, and a flag indicating whether the vector is unbalanced or not.

Machiavelli normally uses a simple block distribution for vectors. This corresponds to the case of a vector balanced across all the processors within a team; the unbalanced case is discussed in Section 4.3.2 entitled Unbalanced Vectors below. Thus, for a vector of size n on P processors, the first processor in the team has the first n/P elements, the second processor has the next n/P elements, and so on. When the vector size n is not an exact multiple of the number of processors P, the last processor will have fewer than n/P elements on it. In the extreme case of n=1 then P−1 processors will have no elements.

Given this distribution, it is easy to construct efficient functions of the vector length and team size that compute the maximum number of elements per processor (used to allocate space), the number of elements on a given processor, and the processor and offset on that processor that a specific index maps to. This last function is critical for performing irregular data-transfer operations, such as sends or fetches of elements.

To allow vectors of user-defined types to be manipulated using MPI operations (for example, to extract an element from such a vector) Machavelli uses MPI's derived datatype functionality. This encodes all the relevant information about a C datatype in a single type descriptor, which can then be used by MPI communication functions to manipulate variables and buffers of the matching type. For every new type used in a vector, the preprocessor therefore generates initialization code to define a matching type descriptor. For example, the pseudocode listing below shows a point structure defined by the user, and the function generated by the preprocessor to create the appropriate type descriptor for MPI.

```
/* Structure defined by user */
typedef struct _point {
    double x;
    double y;
    int tag;
} point;
/* Initialization code generated by preprocessor
        */MPI_Datatype _mpi_point;
void _mpi_point_init ( )
{
    point example;
    int i, count = 2;
    int lengths[2] = { 2, 1 };
    MPI_Aint size, displacements[2];
    MPI_Datatype types [2];
    MPI_Address (&example.x, &displacements[0]);
    types[0] = MPI_DOUBLE;
    MPI_Address (&example.tag, displacements[1]);
    types[1] = MPI_INT;
    for (i = 1; i >= 0; i--) {
        displacements [i] -= displacements [0];
    }
    MPI_Type_struct (count, lengths, displacements, types,
            &_mpi_point);
    MPI_Type_commit (&_mpi_point);
}
/* _mpi_point can now be used as an MPI type*/
```

To operate on the vector types, Machiavelli supplies a range of basic data-parallel vector functions. In choosing which functions to support a trade-off must be made between simplicity (providing a small set of functions that can be implemented easily and efficiently) and generality (providing a larger set of primitives that abstract out more high-level operations).

The vector functions can be divided into four basic types: reductions, scans, vector reordering, and vector manipulation. Each of these function types are described further below.

4.2.3 Reductions

A reduction operation on a vector returns the (scalar) result of combining all elements in the vector using a binary associative operator, $\oplus$. Machiavelli supports the reduction operations shown in Table1 below. The operations reduce_min_index and reduce_max_index extend the basic definition of reduction, in that they return the (integer) index of the minimum or maximum element, rather than the element itself.

TABLE 1

| Function Name | Operation | Defined On |
| --- | --- | --- |
| reduce_sum | Sum | All numeric types |
| reduce_product | Product | All numeric types |
| reduce_min | Minimum Value | All numeric types |
| reduce_max | Maximum Value | All numeric types |
| reduce_min_index | Index of Minimum | All numeric types |
| reduce_max_index | Index of Maximum | All numeric types |
| reduce_and | Logical and | Integer types |
| reduce_or | Logical or | Integer types |
| reduce_xor | Logical exclusive-or | Integer types |

The implementation of reduction operations is very straightforward. Every processor performs a loop over its own section of the vector, accumulating results into a variable. They then combine the accumulated local results in an MPI_Allreduce operation, which returns a global result to all of the processors. The preprocessor generates reduction functions specialized for a particular type and operation as necessary. As an example, the following pseudocode listing shows the specialization forreduce_min_double, which returns the minimum element of a vector of doubles. The use of the team structure passed in the first argument will be explained in more detail in Section 4.4.

```
double reduce_min_double (team *tm, vec_double src)
{
    double global, local = DBL_MAX;
    int i, nelt = src.nelt_here;
    for (i = 0; i < nelt; i++) {
        double x = src.data[i];
        if (x < local) local = x;
    }
    MPI_Allreduce (&local, &global, 1, MPI_DOUBLE, MPI_MIN,
    tm->com);
    return global;
}
```

4.2.4 Scans

A scan, or parallel prefix, operation can be thought of as a generalized reduction. Take a vector v of length n, containing elements $v_0, v_1, v_2, \ldots$, and an associative binary operator $\otimes$ with an identity value of id. A scan of v returns a vector of the same length n, where the element $v_i$ has the value $id \otimes v_0 \otimes v_1 \otimes \ldots v_{i-1}$ Note that this is the "exclusive" scan operation; the inclusive scan operation does not use the identity value, and instead sets the value of $v_1$ to $v_0 \otimes v_1 \otimes \ldots \otimes v_{i-1}$ Machiavelli supplies a slightly smaller range of scans than of reductions, as shown in Table 2, because there is no equivalent of the maximum and minimum index operations.

TABLE 2

| Function Name | Operation | Defined On |
| --- | --- | --- |
| scan_sum | Sum | All numeric types |
| scan_product | Product | All numeric types |
| scan_min | Minimum value | All numeric types |
| scan_max | Maximum value | All numeric types |

TABLE 2-continued

| Function Name | Operation | Defined On |
| --- | --- | --- |
| scan_and | Logical and | Integer types |
| scan_or | Logical or | Integer types |
| scan_xor | Logical exclusive-or | Integer types |

Scans are only slightly more difficult to implement than reductions. Again, every processor performs a loop over its own section of the vector, accumulating a local result. The processors then combine their local results using an MPI_Scan operation, which returns an intermediate scan value to each processor. A second local loop is then performed, combining this scan value with the original source values in the vector to create the result vector. There is an additional complication in that MPI provides an inclusive scan rather than an exclusive one. For operations with a computable inverse (for example, sum) the exclusive scan can be computed by applying the inverse operation to the inclusive result and the local intermediate result. For operations without a computable inverse (for example, min), the inclusive scan is computed and the results are then shifted one processor to the "right" using MPI_Sendrecv. As an example, the following pseudocode shows scan_sum_int, which returns the exclusive prefix sum of a vector of integers.

```
vec_int scan_sum_int (team *tm, vec_int src)
{
    int i, nelt = src.nelt_here;
    int incl, excl, swap, local = 0;
    vec_int result;
    result = alloc_vec_int (tm, src.length);
    /* Local serial exclusive scan */
    for (i = 0; i < nelt; i++) {
        swap = local;
        local += src.data[i];
        dst.data[i] = swap;
    }
    /* Turn inclusive MPI scan into exclusive result */
    MPI_Scan (&local, &incl, 1, MPI_INT, MPI_SUM, tm->com);
    excl = incl - local;
    /* Combine exclusive result with previous scan */
    for (i = 0; i < nelt; i++) {
        dst.data[i] += excl;
    }
    return result;
}
```

4.2.5 Vector Reordering

There are two basic vector reordering functions, send and fetch, which transfer source elements to a destination vector according to an index vector. In addition, the function pack, which is used to redistribute the data in an unbalanced vector can be seen as a specialized form of the send function. These are the most complicated Machiavelli functions, but they can be implemented using only one call to MPI_Alltoall to set up the communication, and one call to MPI_Alltoallv to actually perform the data transfer.

send (vec_source, vec_indices, vec_dest)

send is an indexed vector write operation. It sends the values from the source vector vec_source to the positions specified by the index vector vec_indices in the destination vector vec_dest, so that vec_dest[vec_indices[i]]=vec_source[i].

This is implemented using the following operations on each processor. For simplicity, assume that there are P processors, that the vectors are of length n, and that there are exactly n/P elements on each processor.

1. Create two arrays, num_to_send[P] and num_to_recv[P]. These will be used to store the number of elements to be sent to and received from every other processor, respectively.
2. Iterate over this processor's n/P local elements of vec_indices. For every index element i, compute the processor q that it maps to, and increment num_to_send[q]. Each processor now knows how many elements it will send to every other processor.
3. Exchange num_to_send[P] with every other processor using MPI_Alltoall( ). The result of this is nun_to_recv[P], the number of elements to receive from every other processor.
4. Allocate a data array data_to_send[n/P] and an index array indices_to_send[n/P]. These will be used to buffer data and indices before sending to other processors. Similarly, allocate a data array data_to_recv[n/P] and an index array indices_to_recv[n/P]. Conceptually, the data and index arrays are allocated and indexed separately, although in practice they can be allocated as an array of structures to improve locality.
5. Perform a plus-scan over num_to_recv[0 ] and num_to_send[ ], resulting in arrays of offsets send_ptr[P] and recv_ptr[P]. These offsets will act as pointers into the data_and indices_arrays.
6. Iterate over this processor's n/P local elements of vec_indices[ ]. For each element vec indices[i], compute the processor q and offset o that it maps to. Fetch and increment the current pointer, ptr=send_ptr[q]++. Copy vec_source[i] to data_to_send[ptr], and copy o to indices_to_send[ptr].
7. Call MPI_Alltoallv( ). Send data from data_to_send[ ] according to the counts num_to_send[ ], and receive into data_to_recv[ ] according to the counts num_to_recv[ ]. Do the same for indices_to_send[ ].
8. Iterate over data_to_recv[ ] and indices_to_recv[ ], performing the vec_dest[indices_to_recv[i]]=data_to_recv[i].

Note that steps 1–3 and 5 are independent of the particular data type being sent. They are therefore abstracted out into library functions. The remaining steps are type-dependent, and are generated as a function by the preprocessor for every type that is the subject of a send.

fetch (vec_source, vec_indices, vec_dest)

fetch is an indexed vector read operation. It fetches data values from the source vec_source (from the positions specified by the index vector vec_indices) and stores them in the destination vector vec_dest, so that vec_dest[i]=vec_source[vec_indices[i]].

Obviously, this could be implemented using two send operations—one to transfer the indices of the requested data items to the processors that hold the data, and a second to transfer the data back to the requesting processors. However, by combining them into a single function some redundant actions can be removed, since we know ahead of time how many items to send and receive in the second transfer. Again, for simplicity assume that there are P processors, that all the vectors are of length n, and that there are exactly n/P elements on each processor.

1. Create two arrays, num_to_request[P] and num_to_recv[P]. These will be used to store the number of requests to be sent to every other processor, and the number of requests to be received by every other processor, respectively.
2. Iterate over this processor's n/P local elements of vec_indices. For every index element i, compute the processor q that it maps to, and increment num_to_request[q]. Each processor now knows how many elements it will request from every other processor.

3. Exchange num_to_request[ ] with every other processor using MPI_Alltoall( ). The result of this is num_to_recv[ ], the number of requests to receive from every other processor (which is the same as the number of elements to send).

4. Allocate an index array indices_to_request[n/P]. This will be used to buffer indices to request before sending to other processors. Similarly, allocate an index array indices_to_recv[n/P].

5. Perform a plus-scan over num_to_request[ ] and num_to_recv[ ], resulting in arrays of offsets request_ptr[P] and recv_ptr[P]. These offsets will act as pointers into the indices_to_request[ ] and indices_to_recv[ ] arrays.

6. Allocate an index array requested_index[n/P]. This will store the index in a received data buffer that we will eventually fetch the data from.

7. Iterate over this processor's n/P local elements of vec_indices[ ]. For each element vec_indices[i], compute the processor q and offset o that it maps to, Fetch and increment the current pointer, ptr=request_ptr[q]++. Copy o to indices_to_request[ptr].

8. Call MPI_Alltoallv( ). Send data from request_to_send[ ] according to the element counts in num_to_request[ ], and receive into request_to_recv[ ] according to the element counts in num_to recv[ ].

9. Allocate data arrays data_to_send[n/P] and data_to_recv[n/P].

10. Iterate over request_to_recv[ ], extracting each offset in turn, fetching the requested element, and storing it in the data buffer, data_to_send[i]=vec_dest[request_to_recv[i]].

11. Call MPI_Alltoallv( ). Send data from data_to send[ ] according to the element counts in num_to_recv[ ], and receive into data_to_recv[ ] according to the counts in num_to_request[ ].

12. Iterate over data_to_recv[ ] and requested_index[ ], performing the operation vec_dest[i]=data_to_recv[requested_index[i]].

Again, steps 1–8 are independent of the particular data type being requested, and abstracted out into library functions, while the remaining steps are generated as a function by the preprocessor for every type that is the subject of a fetch.

pack (vec_source)

pack redistributes the data in an unbalanced vector so that it has the block distribution property described in Section 4.2.2. An unbalanced vector (that is, one that does not obey this property, but instead has an arbitrary amount of data on each processor) can be formed either by an apply-to-each operator with a conditional (see Section 4.3) or by appending the results of recursive function calls (see Section 4.5). The pack function is normally called as part of another Machiavelli operation.

pack is simpler than send since we will send contiguous blocks of elements between processors, rather than sequences of elements with the appropriate offsets to s_to_re them in.

1. Exchange vec_source.nelt_here with every other processor using MPI_Alltoall( ). The result of this is num_on_each[P].

2. Perform a plus-scan across num_on_each[P] into first_on_each[P]. The final result of the plus scan is the total length n of the vector.

3. From n, compute the number of elements per processor in the final block distribution, final_on_each[P], and allocate a receiving array data_to_recv[n/P].

4. Allocate two arrays, num_to_recv[P] and num_to_send[P].

5. Iterate over final_on_each[P], computing which processor(s) will contribute data for each destination processor in turn. If this processor will be receiving, update num_to_recv[ ]. If this processor will be sending, update num_to_send[ ].

6. Call MPI_Alltoallv( ), sending data from vec_source.data[ ] according to the element counts in num_to_send[ ], and receiving into data_to_recv[ ] according to the element counts in num_to_recv.

7. Free the old data storage in vec_source.data[ ] and replace it with data_to_recv[ ].

4.2.6 Vector Manipulation

Machiavelli also supplies seven functions that manipulate vectors in various ways. Most of these have simple implementations. All but length and free are specialized for the particular type of vector being manipulated.

free(vector)

Frees the memory associated with vector vector.

new_vec(n)

Returns a vector of length n. This is translated in the parallel and serial code to calls to the underlying Machiavelli functions alloc_vec_type and alloc_vec_type_serial, respectively.

length (vector)

Returns the length of vector vector. This simply returns the length field of the vector structure, that is, vector.length.

get (vector, index)

Returns the value of the element of vector vector at index index. Using the length of vector, every processor computes the processor and offset that index maps to. The processors then perform a collective MPI_Broadcast operation, where the processor that holds the value contributes the result. As an example, the following code listing shows the parallel implementation of get for a user-defined point type.

```
point get_point (team *tm, vec_point src, int i)
{
  point result;
  int proc, offset;
  proc_and_offset (I, src.length, tm->nproc, &proc, &offset);
  if (proc == tm->rank) {
    dst = src.data[offset];
  }
  MPI_Bcast (&result, 1, mpi_point, proc, tm->com)
  return result;
}
``` set (vector, index, value)

Sets the element at index index of vector vector to the value value. Again, every processor computes the processor and offset that index maps to. The processor that holds the element then sets its value. As an example, the following code listing shows the parallel implementation of set for a vector of characters.

```
void set_char (team *tm, vec_char dst, int i, char elt)
{
  int proc, offset;
```

```
      proc_and_offset (i, src.length, tm->nproc, &proc, &offset);
      if (proc == tm->rank) {
         dst.data[offset] = elt;
      }
   }
``` index (length, start, increment)

Returns a vector of length length, containing the numbers start, start+increment, start+2*increment, . . . . This is implemented as a purely local loop on each processor, and is specialized for each numeric type. As an example, the following code listing shows the implementation of index for integer vectors.

```
vec_int index_int (team *tm, int len, int start, int incr)
{
   int i, nelt;
   vec_int result;
   /* Start counting from first element on this processor */
   start += first_elt_on_proc (tm->this_proc) * incr;
   result = alloc_vec_int (tm, len);
   nelt = result.nelt_here;
   for (i = 0; i < nelt; i++, start += incr)
      result.data[i] = start;
   }
   return result;
}
``` distribute (length, value)

Returns a vector of length length, containing the value value in each element. This is defined for any user-defined type, as well as for the basic C types. Again, it is implemented with a purely local loop on each processor. As an example, the following code listing shows the parallel implementation of distribute for double-precision floating-point vectors.

```
vec_double distribute_double (team *tm, int len, double elt)
{
   int i, nelt;
   vec_int result;
   result = alloc_vec_double (tm, len);
   nelt = result.nelt_here;
   for (i = 0; i < nelt; i++)
      result.data[i] = elt;
   }
   return result;
}
``` vector (scalar)

Returns a single-element vector containing the variable scalar. This is equivalent to dist (1, scalar), and is provided merely as a convenient shorthand.

replicate (vector, n)

Given a vector vector of length m, and an integer n, returns a vector of length m×n. containing n copies of vector. This is converted into a doubly-nested loop in serial code as shown in the following code listing, and into a sequence of n operations in parallel code.

```
vec_pair replicate_vec_pair_serial (vec_int src, int n)
{
   int i, j, r, nelt;
```

```
   vec_pair result;
   nelt = src->nelt_here;
   result = alloc_vec_pair_serial (nelt * n);
   r = 0;
   for (i = 0; i < n; i++) {
      for (j = 0; j < nelt; j++) {
         result.data[r++] = src->data[j];
      }
   }
   return result;
}
``` append (vector, vector [, vector])

Appends two or more vectors together, returning the result of their concatenation as a new vector. This is implemented as successive calls to a variant of the pack function. Here it is used to redistribute elements of a vector that is spread equally among the processors to a smaller subset of processors, each representing a particular section of a longer vector. The Machiavelli preprocessor converts an n-argument append to n successive calls to pack, each to a different portion of the result vector. As an example, the following code listing shows the implementation of append for three integer vectors.

```
vec_int append_3_vec_int (team *tm, vec_int vec_1,
         vec_int vec_2, vec_int vec_3)
{
   int len_1 = vec_1.length;
   int len_2 = vec_2.length;
   int len_3 = vec_3.length;
   vec_int result = alloc_vec_int (tm, len_1 + len_2 + len_3);
   pack_vec_int (tm, result, vec_1, 0);
   pack_vec_int (tm, result, vec_2, len_1);
   pack_vec_int (tm, result, vec_3, len_1 + len_2);
}
```

The next four functions (odd, even, interleave, and transpose) can all be constructed from send combined with other primitives. However, providing direct functions allows for a more efficient implementation by removing the need for the use of generalized indexing. That is, each of the four functions preserves some property in its result that allows us to precompute the addresses to send blocks of elements to, rather than being forced to compute the address for every element, as in send.

even (vector, n)

odd (vector, n)

Given a vector, and an integer n, even returns the vector composed of the even-numbered blocks of elements of length n from vector. Thus, even (foo, 3) returns the elements 0, 1, 2, 6, 7, 8, 12, 13, 14, . . . of vector foo . odd does the same, but for the odd-numbered blocks of elements. The length of vector is assumed to be an exact multiple of twice the block-size n. As an example, the next code listing shows the serial implementation of even for a user-defined pair type. The parallel implementations of odd and even simply discard the even and odd elements respectively, returning an unbalanced vector. Note that the use of generalized odd and even primitives (rather than simply basic single-element odd and even) allows them to be used for other purposes. For example. even (bar, length (bar)/2) returns the first half of vector bar.

```
vec_pair even_vec_pair (vec_pair src, int blocksize)
{
    int i, j, r, nelt;
    vec_pair result;
    nelt = src.nelt_here;
    alloc_vec_pair (nelt / 2, &result);
    r = 0;
    for (i = 0; i < nelt; i += blocksize) {
        for (j = 0; j < blocksize; j++) {
            result.data[r++] = src.data[i++];
        }
    }
    return result;
}
``` interleave (vec1, vec2, n)

Given two vectors vec1 and vec2, and an integer n, it returns the vector composed of the first fi elements from vec1, followed by the first n elements from vec2, followed by the second n elements from vec1, and so on. As such, it does the opposite of even and odd. Again, the use of a generalized interleave primitive allows it to be used for other purposes. For example, given two m×n matrices A and B, interleave(A, B, n) returns the 2m×n matrix whose rows consist of the appended rows of A and B. The lengths of vec1 and vec2 are assumed to be the same, and an exact multiple of the blocksize n.

transpose (vector, m, n)

Given a vector vector which represents an n x m matrix, returns the vector representing the transposed n×m matrix.

4.3 Data-Parallel Operations

For general data-parallel computation, Machiavelli uses the apply-to-each operator, which has the following syntax:

{expr}: elt. in vec [, elt in vec] [|cond]} expr is any expression (without side-effects) that can be the right-hand side of an assignment in C. elt is an iteration variable over a vector vec. The iteration variable is local to the body of the apply-to-each operator. There may be more than one vector, but they must have the same length. cond is any expression without side-effects that can be a conditional in C.

The effect of this construct is to iterate over the source vector(s), testing whether the condition is true for each element, and if so evaluating the expression and writing the result to the result vector.

4.3.1 Implementation

The Machiavelli preprocessor converts an apply-to-each operation without a conditional into a purely local loop on each processor, iterating over the source vectors and writing the resultant expression for each element into the destination vector. The absence of synchronization between processors explains why the expressions within an apply-to-each cannot rely on side effects; any such effects would be per-processor, rather than global across the machine. In general, this means that C's pre- and post-operations to increment and decrement variables cannot be used inside an apply-to-each. As an example, the following code listing shows a simple data-parallel operation and the resulting code.

```
/* Machiavelli code generated from:
*    vec_double diffs = {(elt - x_mean)^2 : elt in x}
*/
{
```

```
    int i, nelt = x.nelt_here;
    diffs = alloc_vec_double (tm, x.length);
    for (i = 0; i < nelt; i++) {
        double elt = x.data[i];
        diffs.data[i] = (elt - x_mean)^2;
    }
}
```

The independence of loop expressions also enables the Machiavelli preprocessor to perform loop fusion on adjacent apply-to-each operations that are iterating across the same vectors.

4.3.2 Unbalanced vectors

If a conditional is used in an apply-to-each, then the per-processor pieces of the destination vector may not have the same length as the pieces of source vector(s). The result is that we are left with an unbalanced vector; that is, one in which the amount of data per processor is not fixed. This is marked as such using an "unbalanced" flag in its vector structure. As an example, the following code listing shows the parallel implementation of an apply-to-each with a simple conditional.

```
/* Machiavelli code generated from:
*    vec_double result;
*    result = {(val - mean)^2 : val in values, flag in flags
*              | (flag != 0)};
*/
{
    int i, ntrue = 0, nelt = values.nelt_here;
    /* Overallocate the result vector */
    result = alloc_vec_double (tm, values.length);
    /* ntrue counts conditionals */
    for (i = 0; i < nelt; i++) {
        int flag = flags.data[i];
        if (flags != 0) {
            double val = values.data[i];
            result.data[ntrue++] = (val - mean)^2;
        }
    }
    /* Mark the result as unbalanced */
    result.nelt_here = ntrue;
    result.unbalanced = true;
}
```

An unbalanced vector can be balanced (that is, its data can be evenly redistributed) across the processors using a pack function, as described above. The advantage of not balancing a vector is that by not calling pack we avoid two MPI collective operations, one of which transfers a small and fixed amount of information between processors (MPI_Allgather) while the other may transfer a large and varying amount of data (MPI_Alltoallv).

Given an unbalanced vector, we can still perform many operations on it in its unbalanced state. In particular, reductions, scans, and apply-to-each operations (including those with conditionals) that operate on a single vector are all oblivious to whether their input vector is balanced or unbalanced, since they merely loop over the number of elements present on each processor. Given the underlying assumption that local operations are much cheaper than transferring data between processors, it is likely that the time saved by avoiding data movement in this way outweighs the time lost in subsequent operations caused by not balancing the data across the processors, and hence resulting in all other processors waiting for the processor with the most data. Machiavelli only performs a pack when required, but allows the user to manually insert additional pack operations.

The remaining Machiavelli operations that operate on vectors all require their input vectors to be packed before they can proceed. The implementations of get, set, send, fetch are therefore extended with a simple conditional that tests the "unbalanced" flag of their input vector structures, and performs a pack on any that are unbalanced. These operations share the common need to quickly compute the processor and offset that a specific vector index maps to; a balanced block distribution can satisfy this need. Apply-to-each operations on multiple vectors are also extended with test-and-pack, although in this case the requirement is to assure that vectors being iterated across in the same loop share the same distribution. Two further optimizations that are possible when using unbalanced vectors are discussed in the next section.

4.4 Teams

Machiavelli uses teams to express control-parallel behavior between data-parallel sections of code, and in particular to represent the recursive branches of a divide-and-conquer algorithm. A team is a collection of processors, and acts as the context for all functions on vectors within it. A vector is distributed across the processors of its owning team, and can only be operated on by data-parallel functions within that team. Teams are divided when a divide-and-conquer algorithm makes recursive calls, and merged when the code returns from the calls. Otherwise, teams are mutually independent, and do not communicate or synchronize with each other. However, unless the programmer wants to bypass the preprocessor and gain direct access to the underlying team functions, the existence of teams is effectively hidden.

4.4.1 Implementation

A team is represented by the MPI concept of a communicator. Specifically, a communicator describes a specific collection of processors, and when passed to an MPI communication function, restricts the "visible universe" of that communication function to the processors present in the communicator.

The internal representation of a team consists of a structure containing the MPI communicator, the number of processors in the team, and the rank of this processor in the team. All processors begin in a "global" team, which is then subdivided by divide-and-conquer algorithms to form smaller teams. The preprocessor adds a pointer to the current team structure as an extra argument to every parallel function, as was seen in the implementations of Machiavelli functions above. In this way, the subdivision of teams on the way down a recursion tree, and their merging together on the way up the tree, is naturally encoded in the passing of smaller teams as arguments to recursive calls, and reverting to the parent teams when returning from a call.

4.5 Divide-and-conquer Recursion

Machiavelli uses the following syntax:

split (result$_1$=func (arg$_1$), result$_2$=func (arg$_2$)
[, result$_n$=func (arg$_n$) ])

to represent the act of performing divide-and-conquer function calls. n is the result returned by invoking the function func on the argument list arg__n. Team parallelism is implemented by dividing the current team into one subteam per function call, sending the arguments to the subteams, recursing within the subteams, and then fetching the results from the subteams. Each of these steps will be described. Note that in the Machiavelli implementation func must be the same for every call in a given split, although this is not a requirement of the team parallel model

4.5.1 Computing Team Sizes

Before subdividing a team into two or more subteams, we need to know how many processors to allocate to each team.

For Machiavelli's approximate load balancing of teams, the subteam sizes are chosen according to the relative amount of expected work that the subtasks are expected to require. This is computed at runtime by calling an auxiliary cost function defined for each divide-and-conquer function. The cost function takes the same arguments as the divide-and-conquer function, but returns as a result an integer representing the relative amount of work that those arguments will require. By default, the preprocessor generates a cost function that returns the size of the first vector in the argument list (that is, it assumes that the cost will be a linear function of the first vector argument). This can be overridden for a particular divide-and-conquer function divconq by defining a cost function divconc qcost. The following code listing shows a simple cost function for quicksort, which has an expected cost of O(n log n).

```
int quicksort_cost (vec_double s) {
    int n = length (s);
    return (n * (int) log ((double) n));
}
```

The results of a cost function have no units, since they are merely compared to each other. The actual act of subdividing a team is performed with the MPI_Comm_split function which, when given a flag declaring which new subteam this processor should join, creates the appropriate MPI communicator.

4.5.2 Transferring Arguments and Results

Having created the subteams, we must redistribute any vector arguments to the respective subteams (scalar arguments are already available on each processor, since we are programming in an SPMD style). The task is to transfer each vector to a smaller subset of processors. This can be accomplished with a specialized form of the pack function; all that is necessary is to change the computation of the number of elements per processor for the destination vector, and to supply a "processor offset" that serves as the starting point for the subset of processors. However, there are two optimizations that can be made to reduce the number of collective operations.

First, the redistribution function can accept unbalanced vectors as arguments, just as the original pack function can. This is particularly important for divide-and-conquer functions, where the arguments to recursive calls may be computed using a conditional in an apply-to-each, which results in unbalanced vectors. Without the ability to redistribute these unbalanced vectors, the number of collective communication steps would be doubled (first to balance the vector across the original team, and then to redistribute the balanced vector to a smaller subteam).

Second, the redistribution function can use a single call to MPI_Alltoallv to redistribute a vector to each of the subteams. Consider the recursion in quicksort:

split (left=quicksort (les),
  right=quicksort (grt));

les and grt are being supplied as the argument to recursive function calls that will take place in different subteams. Since these subteams are disjoint, a given processor will send data from either les or grt to any other given processor, but never from both. We can therefore give MPI_Alltoallv the appropriate pointer for the data to send to each of the other processors, sending from les to processors in the first subteam and from grt to processors in the second subteam. Thus, only one call to MPI_Alltoallv is needed for each of the vector arguments to a function.

After the recursive function call, we merge teams again, and must now extract a result vector from each subteam, and redistribute it across the original (and larger) team. This can be accomplished by simply setting the "unbalanced" flag of each result lector, and relying on later operations that need the vector to be in a balanced form to redistribute it across the new, larger team. This can be seen as a reverse form of the "don't pack until we recurse" optimization that was outlined above—now. we don't expand a vector until we need to.

To illustrate these features, we will use the simplified version of quicksort shown below, which partitions the input into two vectors (containing those elements less than or equal to the pivot, and greater than the pivot) instead of three:

```
vec_int quicksort (s)
{
    int pivot;
    vec_int leq, grt, left, right, result;
    if (length(s) < 2) {
        return s;
    } else {
        pivot = get(s, length(s) / 2);
        leq = {x : x in s | x <= pivot};
        grt = {x : x in s | x > pivot};
        free(s);
        split (left = quicksort (leq),
               right = quicksort (grt));
        result = append(left, right);
        free(left); free(right);
        return result;
    }
}
```

Figure 5A:
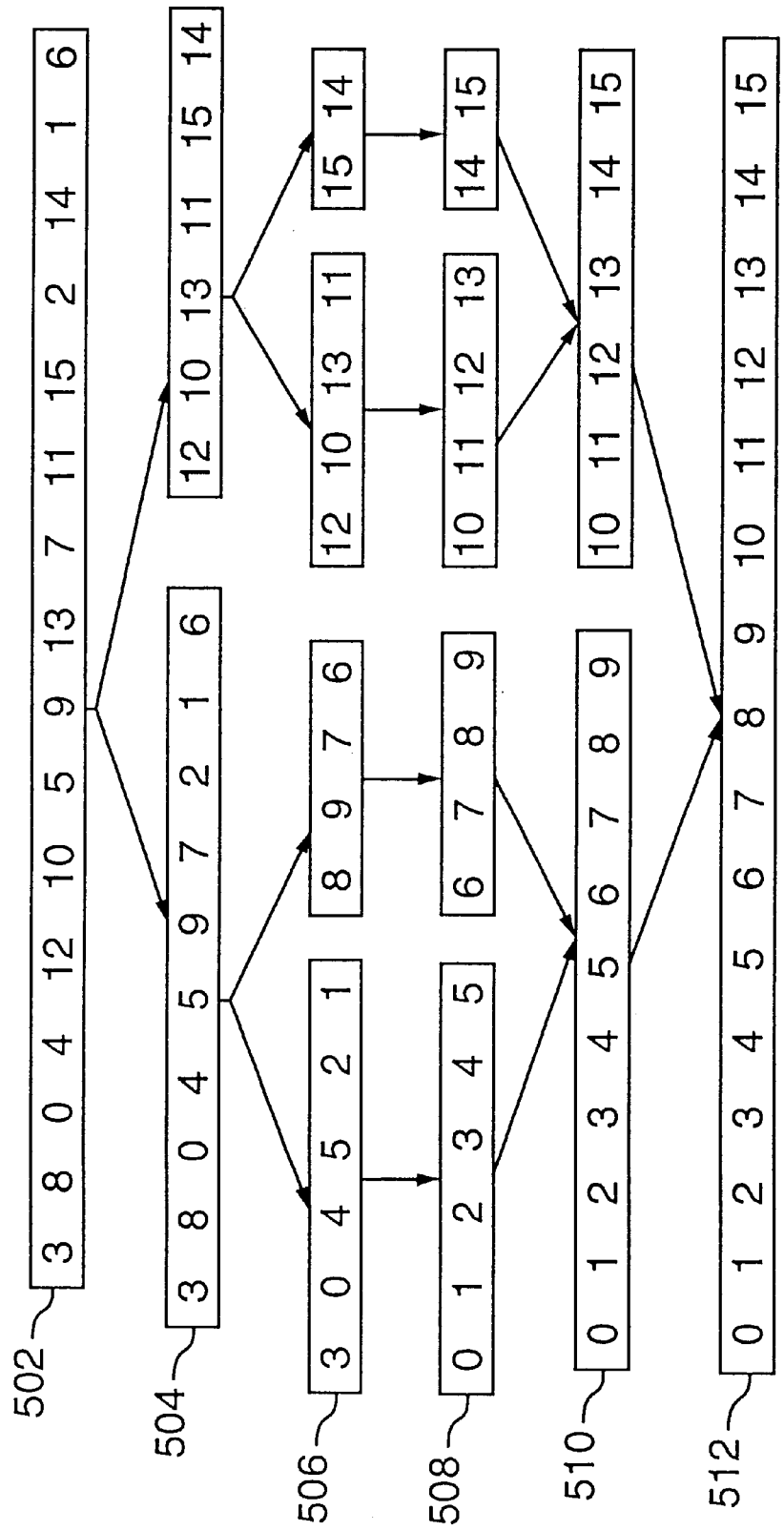
FIGS. 5A–E are diagrams illustrating examples of the use of a lazy collection oriented data type in a nested parallel program.
Figure 5B:
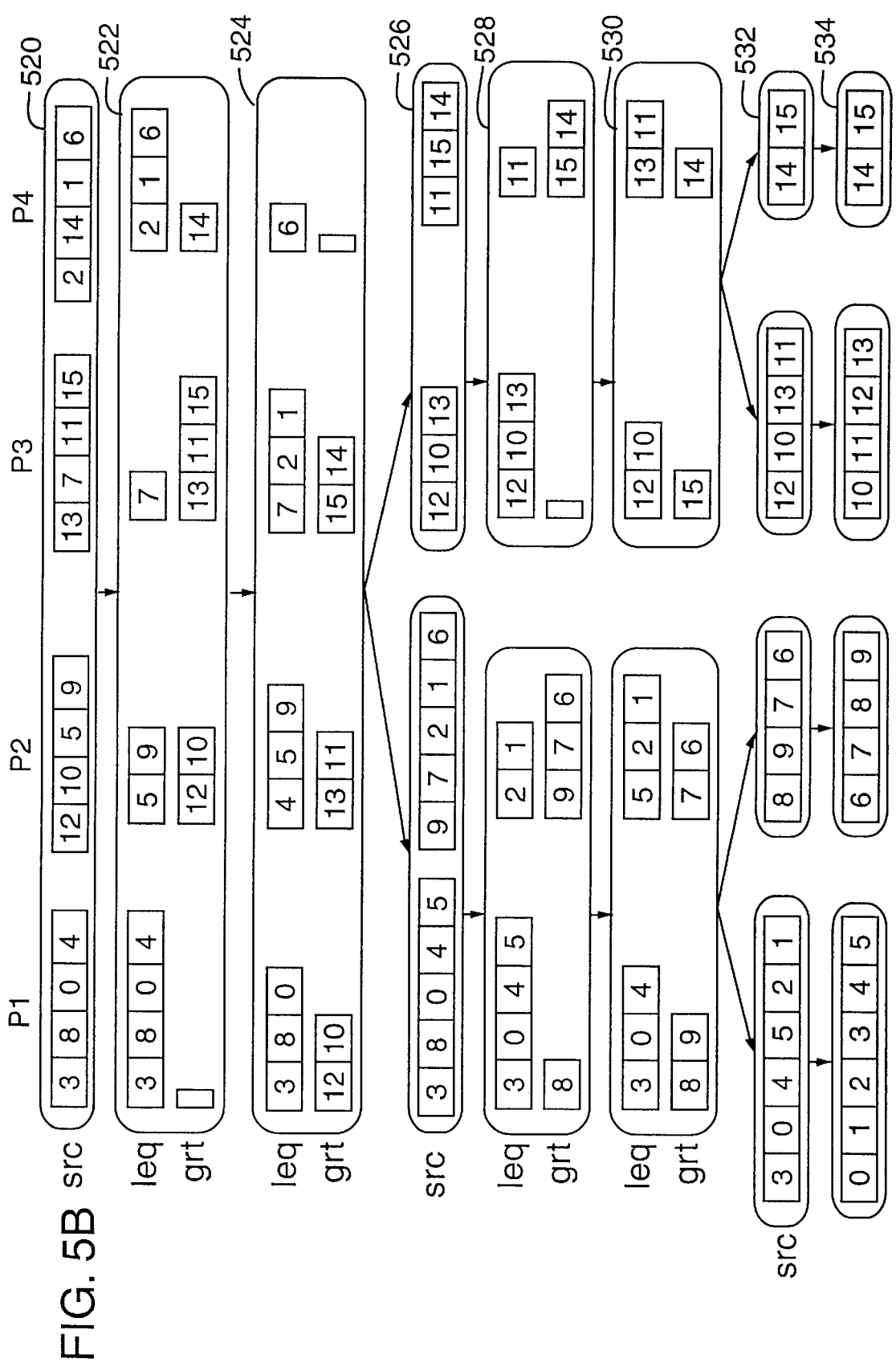
Figure 5C:
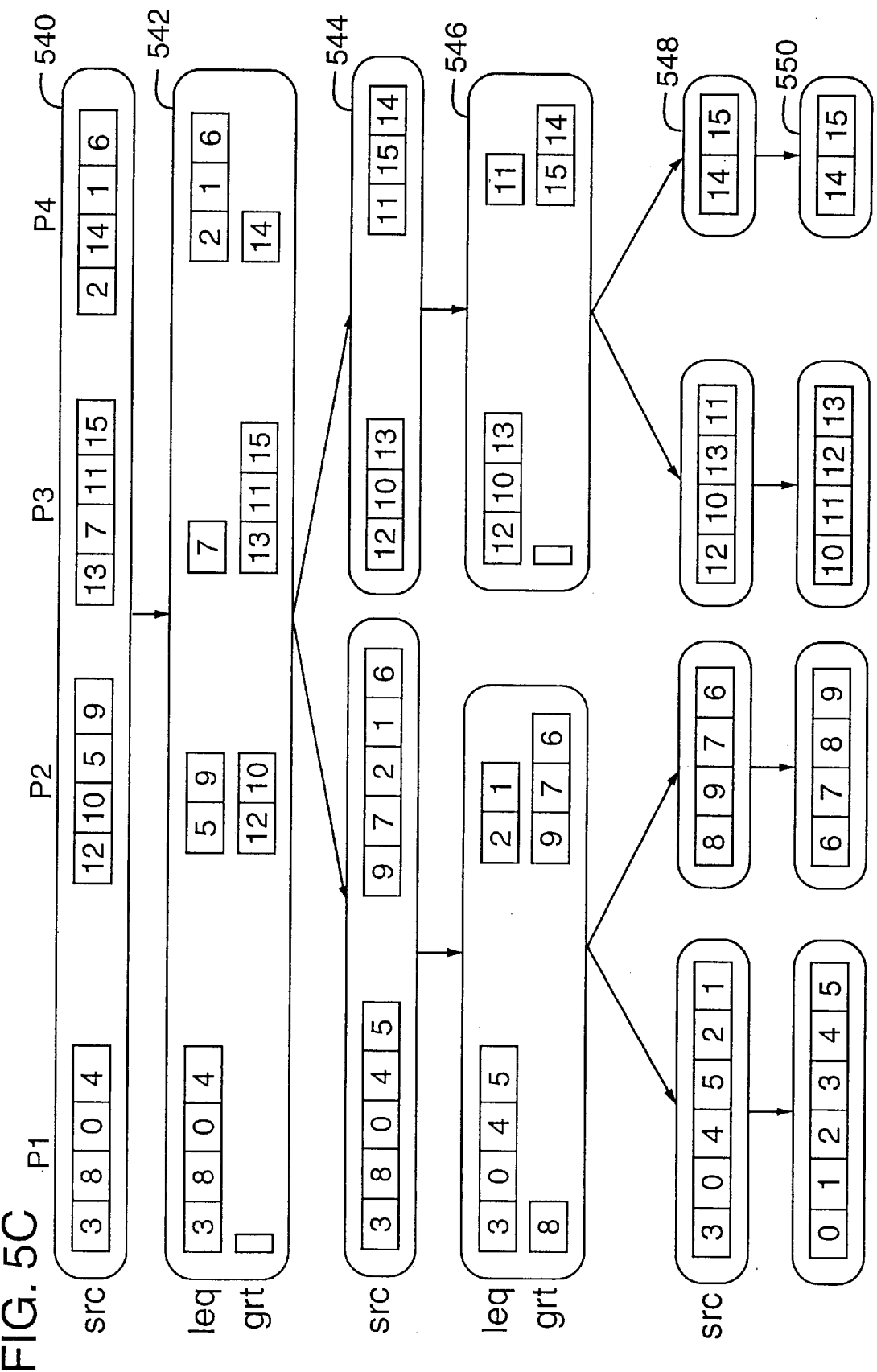

As an example, consider the algorithm sorting the following set of numbers from 0 to 15:

[3 8 0 4 12 10 5 9 13 7 11 15 2 14 1 6]

on four processors. FIG. 5A shows an overview of the recursion tree for this example. FIGS. 5B and 5C show the effects with and without both the "don't pack before split" optimization, and FIGS. 5C and 5E show the effects with and without the "postpone append till top level" optimization.

FIG. 5A shows an example of how this version of quicksort travels down and then back up the recursion tree. As it travels down the recursion tree (levels 502 to 506), quicksort splits the set of numbers into smaller and smaller left and right parts. As it travels up the recursion tree (levels 508 to 512), quicksort combines the results. On each level traveling down the recursion tree, the middle element is chosen as the pivot, and two new subproblems are formed containing the elements less than or equal to, and greater than, the pivot. In this example, four processors are being used, so when four subproblems have been formed the individual processors run a serial version of the algorithm on their subproblem (step 506). They then return to the parallel code, which appends the subresults as it returns up the tree.

Figure 5D:
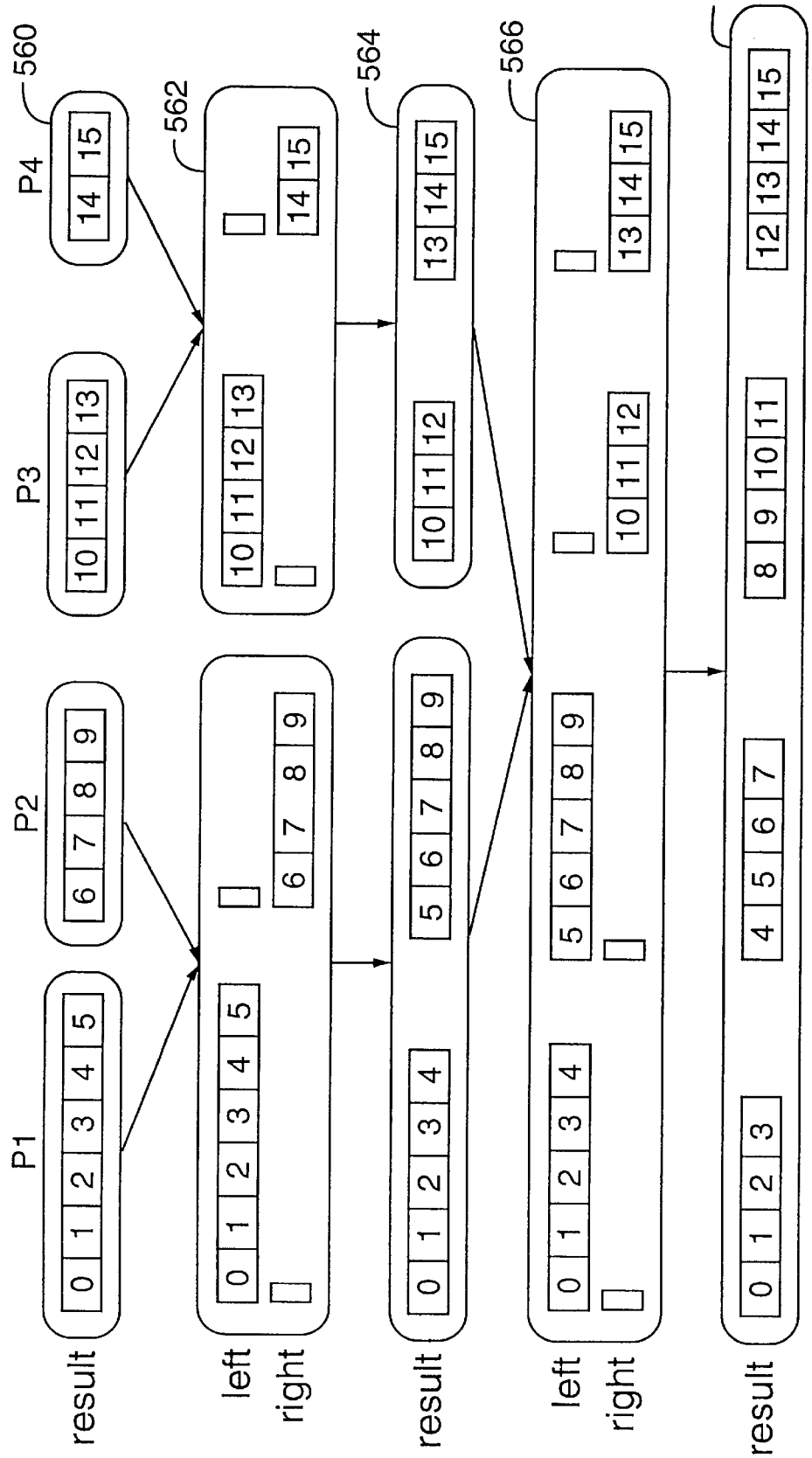
Figure 5E:
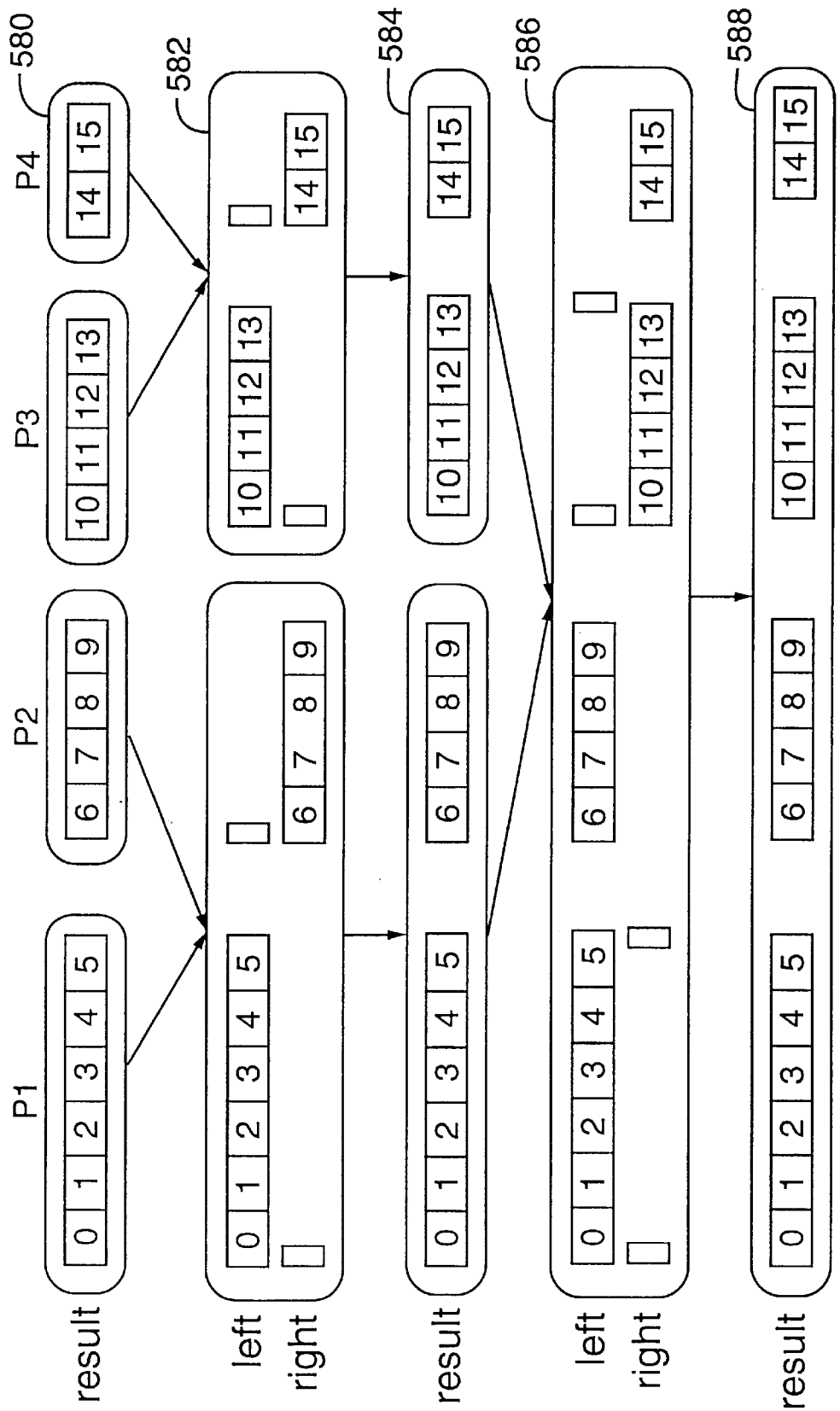

FIGS. 5B and 5C show in more detail the layout of the vectors used on the way down the recursion tree, while FIGS. 5D and 5E show the layout of the vectors used on the way up the recursion tree.

FIG. 5B shows the layout without the use of lazy vectors and the ability of the redistribution function to handle lazy input. The boxes show the data elements held on each processor, where a horizontal line represents a given vector. The contiguous segments of numbers represent the portions of a vector stored locally for one of the four processors. The enclosing ovals show the division of processors between teams. Initially, all processors are in one team. After the partitioning step. the resulting vectors are unbalanced (522). They are then rebalanced so that for each vector, each processor (except the last one, in this case) has an equal number of elements (see oval 524).

In particular, quicksort picks "9" as the pivot element at level 522. and the two conditional apply-to-each expressions create two new vectors: leq, containing the elements less than or equal to the pivot (a total of 10 elements), and grt, containing the elements greater than the pivot (the remaining 6 elements). As can be seen, these vectors are unbalanced. The runtime system now uses two pack operations to make these vectors "balanced" as shown in oval 524 (that is, with a constant number of elements per processor, except for the last one).

Note that if the system did not support lazy vectors, this rebalancing step would be part of the partitioning operation. If the system did support lazy vectors, but the redistribution function required balanced input, the redistribution function would call the pack function.

After the vectors are rebalanced, the split step then subdivides the team into two new teams, and calls the redistribution function to redistribute the vectors to the two teams (526). The data is redistributed so that each team gets one (balanced) vector as shown in level 526.

The code then recurses in each new team, creating unbalanced vectors after the partitioning step (528). In this example, the two teams pick "5" and "13" as their new pivot elements, and create two new sets of vectors. Again, two pack operations are required to balance the vectors on their respective teams (530).

The two teams recurse again, creating four individual teams and redistributing the data so that each new team gets one of the four vectors shown at level 532. At this stage the subteams each contain a single processor, so the parallel code now calls the serial code instead of recursing again, resulting in the data on each processor being sorted (534).

FIG. 5C shows the effect of extending the redistribution function to handle lazy input. In particular, FIG. 5C shows how the interprocessor communication for rebalancing the vectors before a split as in FIG. 5B is eliminated since Machiavelli's implementation of the split step supports lazy input. The steps in FIG. 5C are initially the same as in FIG. 5B. Note that levels 540 and 542 in FIG. 5B are the same as levels 520 and 522 in FIG. 5C.

However, in contrast to FIG. 5B, the vectors are left in their unbalanced state after the partitioning step (542). The split step again subdivides the team and calls the redistribution function, which combines the balancing and redistribution of data into a single step. When the algorithm recurses, subdividing into two teams of two processors (see level 544 to 546), the unbalanced vectors are redistributed directly to their new teams, saving two intermediate pack operations. Again, when each of these two teams split into two new teams of one processor each (level 546 to 548), the two recursions now redistribute the unbalanced vectors directly to the four new teams, saving two intermediate pack operations each. This combination of rebalancing and redistributing the vectors into a single step saves an unnecessary data rearrangement step in each team on each level of recursion, and thus reduces expensive interprocessor communication.

FIG. 5C ends similarly to FIG. 5B. When each team only has one processor, the parallel code on each processor invokes the serial code, which sorts the local elements of the vector (550). When the four individual processors finish the serial code, each contains a sorted portion of the result vector as shown.

FIG. 5D shows the return from the recursion (when we are appending subresults together) in the case where lazy vectors are supported but not the optimization of postponing an append operation until the top level. Initially all the processors are in individual teams (560). First, they return to the parent teams from which the subteams were formed. Thanks to lazy vectors, no redistribution of data is necessary. Instead, the left and right vectors are created as unbalanced. Depending on the processor, the local data for these vectors will either be empty, or be the entire result of the subteam (562). Thus, no data elements are moved, either between processors or on processors (the data pointer in the representation of the left and right vectors will be either null or will point to the data of the result vector).

Next, these vectors are appended together within each team, creating a new balanced result vector (564). The general append operation requires two pack operations to redistribute the data between the processors to form the balanced vectors shown at level 564.

The processors then return from another level of recursion, to the original top-level team (566). The results of the two teams in turn become the left and right vectors of the top-level team as shown in level 566. Again, the new left and right vectors are left unbalanced, and no data movement is required until the final append step to create the final sorted result (568). In the final append step, these two unbalanced vectors are appended with a further pack to form the final result.

FIG. 5E shows the effect of postponing the append step until the top level of the recursion tree. In effect, we are completely eliminating the append step, and leaving the overall result in an unbalanced state. Again, the return up the recursion tree starts with the four processors returning from serial code (580). As before, the subteams return to the parent teams, and left and right are created in an unbalanced state, pointing to the data from result (582).

The append step now does much the same thing, creating a new result vector whose per-processor data pointer shares the data of left and right (584). However, the append step is now replaced by a local renaming operation that just chooses whether to use the elements from the left or right vector as the result vector on this processor. No interprocessor communication is needed to rearrange data, since the vector is left in an unbalanced state.

At the next level of recursion, the results again become the left and right vectors of the top-level team (586). Another renaming step creates an unbalanced result vector (588). As with all lazy vectors, this will only be balanced if subsequent operations on it require it to be in a balanced state. Note that there is no data movement whatsoever between processors in the steps shown; we are taking advantage of the fact that the split function puts the subproblem of smaller numbers on the "left" and the subproblem of larger numbers on the "right", and thus their results will be naturally ordered.

If any subsequent operations need the result vector to be balanced, a single pack operation will be required to redistribute the elements on the processors from the state shown at level 588 in FIG. 5E to the state shown in level 568 in FIG. 5D.

As illustrated in the quicksort example above, the preprocessor for the Machiavelli system treats the Append operation immediately following a Split call as a special case. This special case implementation of the Append function avoids the inter-processor communication associated with the normal Append function. In the general Append operation, the preprocessor generates one Pack operation per source vector, to reshuffle the data across the processors as shown in 4.2.6. For example, given two equal-size source vectors to be appended together, which are spread across four processors, the run-time code performs the following steps:

create a new vector twice as big (i.e. twice as many elements per processor);

pack the first vector from all four processors into the result vector in the first two processors; and pack the second vector from all four processors into the result vector in the last two processors.

The Machiavelli implementation uses the Pack code to implement the general Append function because this code is sufficiently general to handle a variety of redistribution functions. To clarify, the Machiavelli implementation uses the Pack code to redistribute data elements among processors in the following cases:

1) to redistribute or balance elements of a vector among processors, and 2) as part of the Append function to redistribute elements from more processors to fewer processors.

It is important to note that the Pack code used in the Machiavelli system represents only one possible way of implementing functions for redistributing data among processors. It is a design choice to use Pack code in the Append function. It is also possible to implement distinct functions for re-balancing an unbalanced vector (e.g., a Rebalance or Redistribute function) and for distributing input vectors from more processors to fewer processors (e.g., a Subappend function). The names chosen for the functions are not critical to the invention.

The Machiavelli preprocessor reduces inter-processor communication associated with returns from split calls by treating an Append after a Split as a special case. If the preprocessor determines that the results of a Split call are immediately used as input to an Append function, then it can replace the normal Append function with the "renaming" code described in connection with FIG. 5E. This special case code swaps pointers around so that the vector resulting from the append step on each processor points to the data that was just returned from the Split call. This approach eliminates inter-processor communication that would otherwise result using normal Append operations after Split functions while traveling back up the recursion tree.

Note that the quicksort example makes the assumption that processors are assigned to subteams in numerically increasing order, e.g., processors 0–1 were used for the left part of the split in the example above, and processors 2–3 were used for the right part of the split. Obviously if the order were swapped so that processors 2–3 received the left and processors 0–1 received the right, then the "renaming" append code would give a back-to-front answer. The Machiavelli team-splitting code makes sure that this assumption is always true.

The Machiavelli preprocessor implements the "renaming" optimization by looking one line ahead of a split call to determine if the next line includes an Append operation to join the results of the split call into a result vector. An alternative implementation of the preprocessor could use data-flow analysis to determine if this property holds in the more general case. In particular, standard data-flow analysis used in compilers could be used to find candidates for the renaming optimization in cases where there are additional statements between a Split call and an Append on the results of the Split call, or where vectors derived from the result of a Split call are being appended. As an example of the latter case, consider a program that includes code to add 1 to every element in the left vector, and 2 to every element in the right, creating two new unbalanced vectors, and then an Append function to append the two new vectors. Data-flow analysis could be used to determine that the renaming optimization could be applied to the two new vectors.

An alternative implementation would use another flag in the structure representing a vector. If set, this flag indicates that the vector is not only unbalanced, but is the result of a split. It also records which subteam the vector came from. The flag is cleared after any operation that balances a vector. The flag is set for all vectors returned from a subteam, e.g., returned from a divide-and-conquer function. In contrast to the implementation where the preprocessor always generates code to call the append function when it sees "append( )" in the input code, this approach makes the append function adaptive at runtime based on the state of the input vector. At runtime, the Append function determines whether all of its input vectors are the results of a split, and whether they are in the correct order (e.g. the first vector came from subteam 0, the second from subteam 1, etc). If so, it performs the renaming optimization. Otherwise, it redistributes the data as before. This approach enables a preprocessor to (et the same result as achieved through data flow analysis without overly complicating the preprocessor code. In this particular application, it avoids unnecessary inter-processor communication in cases where the Append function operates on the results of the Split call or data derived from these results without using data-flow analysis before run-time.

4.5.3 Serial Code

The Machiavelli preprocessor generates two versions of each user-defined and inbuilt function. The First version, as described in previous sections, uses MPI in parallel constructs, and team-parallelism in recursive calls. The second version is specialized for single processors with purely local data (that is, a team size of one). In this version, apply-to-each constructs reduce to simple loops, as do the predefined vector operations, and the team-based recursion is replaced with simple recursive calls. As was previously discussed, this results in much more efficient code. For example, the following code listing shows the serial implementation of a fetch function, which can be compared to the 12-step description of the parallel equivalent described above.

```
void fetch_vec_int_serial (vec_int src, vec_int indices,
vec_int dst) {
    int i, nelt = dst.nelt_here;
    for (i = 0; i < nelt; i++) {
        dst[i] = src[indices[i]]
    }
}
```

Where more efficient serial algorithms are available, they can be used in place of the serial versions of parallel algorithms that Machiavelli compiles. Specifically, the user can force the default serial version of a parallel function to be overridden by defining a function whose name matches that of the parallel function but has the added suffix "_serial". For example, the following code listing shows a more efficient serial implementation of quicksort supplied by the user:

```
void user_quicksort (double *A, int p, int r)
{
    if (p < r) {
        double x = A[p];
        int i = p - 1;
        int j = r + 1;
        while (1) {
            do { j--; } while (A[j] > x);
            do { i++; } while (A[i] < x);
            if (i < j) {
                double swap = A[i];
                A[i] = A[j];
                A[j] = swap;
            } else {
                break;
            }
        }
        user_quicksort (A, p, j);
        user_quicksort (A, j+1, r);
    }
}
vec_int quicksort_serial (vec_int src)
{
    user_quicksort (src.data, 0, src.length - 1);
    return src;
}
```

MPI functions can also be used within Machiavelli code, in cases where the primitives provided are too restrictive. As explained above, all user-defined types have equivalent MPI types constructed by the Machiavelli preprocessor, and these MPI types can be used to transfer instances of those types in MPI calls. The fields of a vector and of the current team structure (always available as the pointer tm in parallel code) are also accessible, as shown in the following code listing.

```
typedef struct _vector {
    void *data; /* pointer to elements on this processor */
    int nelt_here; /* number of elements on this processor */
    int length; /* length of the vector */
} vector;
typedef struct _team {
    int nproc; /* number of processors in this team */
    int rank; /* rank of this processor within team */
    MPI_Communicator com; /* MPI communicator containing team */
} team;
Putting all these steps together, the code generated by the preprocessor
for the recursion in the parallel version of quicksort is shown below.
/* Machiavelli code generated from:
    split (left = quicksort (les),
*       right = quicksort (grt)); */
/* Compute the costs of the two recursive calls */
    cost_0 = quicksort_cost (tm, les);
    cost_1 = quicksort_cost (tm, grt);
/* Calculate the team sizes, and which subteam to join */
which_team = calc_2_team_sizes (tm, cost_0, cost_1, &size_0,
&size_1);
/* Create a new team */
    create_new_teams (tm, which_team, size_0, &new_team);
/* Allocate an argument vector to hold the result in the new
team */
arg = alloc_vec_double (&new_team, which team ?
grt.length : les.length);
/* Compute communication patterns among subteams */
setup_pack_to_two_subteams (tm, les.nelt_here,
grt.nelt_here, grt - les, les.length, grt.length, size_0,
size_1);
/* Perform the actual data movement of pack, into the argument
vector */
MPI_Alltoallv (les.data, _send_count, _send_disp,
MPI_DOUBLE,arg.data, _recv_count, _recv_disp,
MPI_DOUBLE, tm->com);
/* Recurse in two different subteams */
if (new_team.nproc == 1) {
    /* If new team size is 1, run serial quicksort */
    result = quicksort_serial (arg);
} else {
```

```
    /* Else recurse in the new team */
    result = quicksort (&new_team, arg);
}
/* Returning from the recursion,
we rejoin original team, discard old */
free_team (&new_team);
/* Assign tmp to left and nullify right, or vice versa,
forming two unbalanced vectors, each on a subset
of the processors in the team */
if (which_team == 1) {
    right = tmp;
    left.nelt_here = 0;
} else {
    left = tmp;
    right.nelt_here = 0;
}
```

4.6 Load Balancing

As mentioned above, the team-parallel model restricts load balancing to individual processors because that is where most of the time is spent when n>>P. We are thus trying to cope with the situation where some processors finish first and are idle. Our goal is to ship function invocations from working processors to idle processors, and then return the result to the originating processor.

The implementation of Machiavelli's load-balancing system is restricted by the capabilities of MPI, and by our desire to include as few parallel constructs as possible in the execution of sequential code on single processors. In the absence of threads or the ability to interrupt another processor, an idle processor is unable steal work from another processor, because the "victim" would have to be involved in receiving the steal message and sending the data. Therefore, the working processors must request help from idle processors. The request cannot use a broadcast operation because MPI broadcasts are a collective operation that all processors must be involved in, and therefore other working processors would block the progress of a request for help. Similarly, the working processor cannot use a randomized algorithm to ask one of its neighbors for help (in the hope that it picks an idle processor), because the neighbor might also be working, which would cause the request to block. Thus, to determine whether another processor is idle (and hence can respond quickly to our request) the run-time code dedicates one processor to keeping track of each processor's status. This processor acts as the manager of active load balancing.

Figure 6:
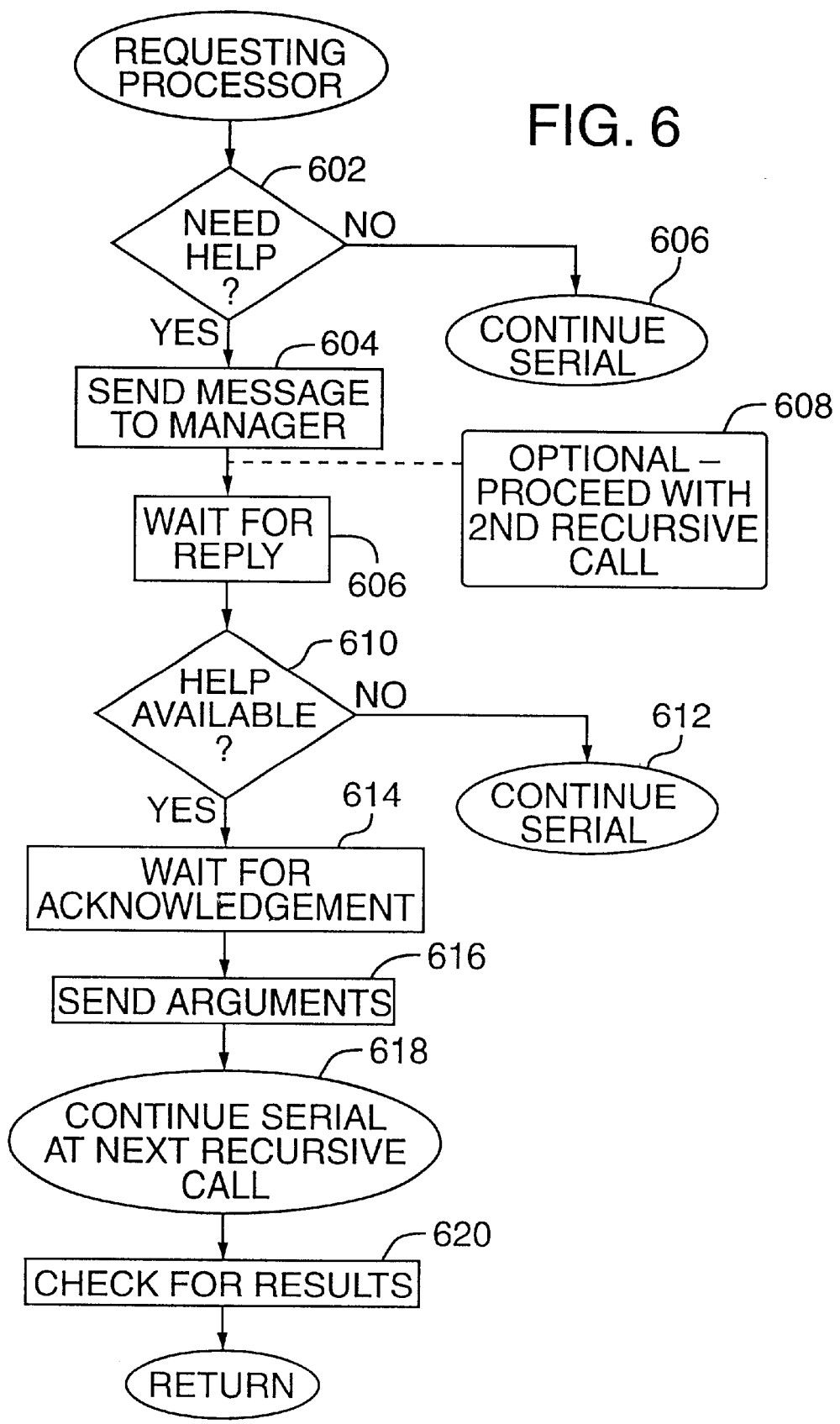
FIG. 6 is a diagram illustrating the operation of a processor seeking to offload its workload in Machiavelli's dynamic load balancing system.
Figure 7:
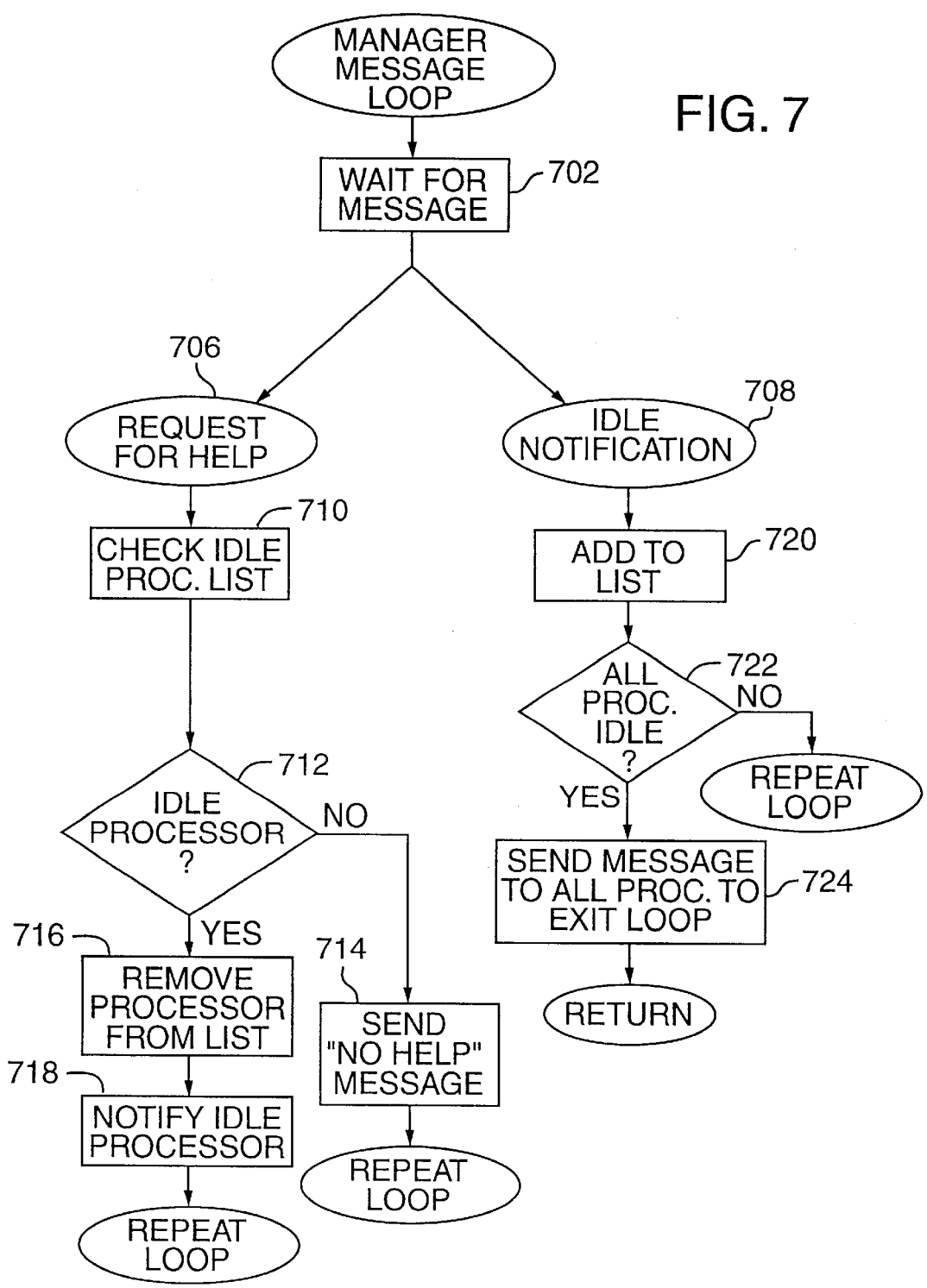
FIG. 7 is a diagram illustrating the message processing functions of a manager processor in Machiavelli's dynamic load balancing system.
Figure 8:
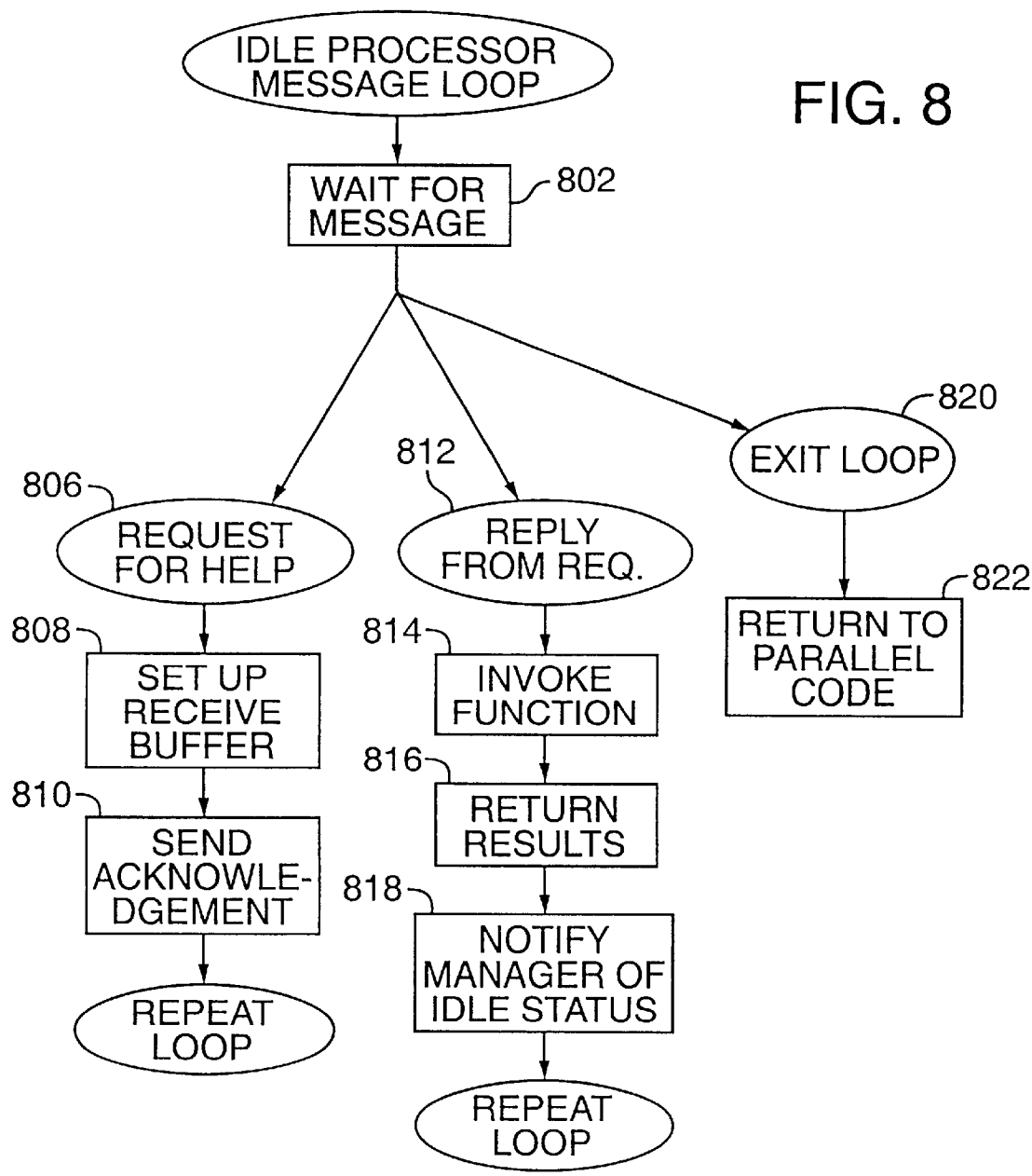
FIG. 8 is a diagram illustrating the message processing functions of an idle processor ii Machiavelli's dynamic load balancing system.

The load-balancing process employs a three-way handshaking protocol among the processor requesting help, the manager, and the idle processor. FIGS. 6, 7, and 8 are flow diagrams illustrating the operation of a processor seeking help, the manager, and the idle processor, respectively. The preprocessor inserts a load-balance test function into the sequential version of every divide-and-conquer function. This test determines whether to ask the manager for help with one or more of the recursive function calls. Decision block 602 in FIG. 6 represents the test executed to determine whether to make a request for help. if this test is satisfied, a short message is sent to the manager, containing the total size of the arguments to the function call (604). If the test is not satisfied, the requesting processor continues with sequential execution of the function (606).

For binary divide-and-conquer algorithms, the requesting processor then blocks waiting for a reply (606). There is no point in postponing the test for a reply until after the requesting processor has finished the second recursive call, since at that point it would be faster to process the first recursive call locally than to send the arguments to a remote processor, wait for it to finish, and then receive the results. For divide-and-conquer algorithms with a branching factor greater than two, the requesting processor can proceed with another recursive call while waiting for the reply (shown as an optional step 608).

FIG. 7 illustrates how the manager processor manages dynamic load balancing. The manager sits in a message-driven loop, maintaining a list of idle processors and waiting for messages to arrive. The other processors send the manager messages when requesting help (see message 706 in FIG. 7) and when they become idle (see message 708 in FIG. 7).

When the manager receives a request for help (706), it checks the list for idle processors (710). If the list contains no idle processors, the manager responds to the requesting processor with a "no help available" message (714). Otherwise, it removes an idle processor from its list (716). and sends the idle processor a message instructing it to help the requesting processor with a function call of the reported size (718).

FIG. 8 shows the operation of an idle processor. Like the manager, the idle processor sits in a message-driven loop, which it enters after finishing the sequential phase of its divide-and-conquer program. In its message loop, the idle processor blocks waiting for a message. On receiving the message from the manager (806), it sets up appropriate receive buffers for the argument (808), and then sends the requesting processor an acknowledgement message signaling its readiness (810). This three-way handshaking protocol guarantees that the receiver has allocated buffers before the arguments are sent, which can result in faster performance from some MPI implementations by avoiding system buffering. It also avoids possible race conditions in the communication between the three processors.

Returning again to FIG. 6, the requesting processor proceeds depending on how the manager responds to its request for help. If the requesting processor receives a "no help available" message from the master (610), it continues with sequential execution (612). Otherwise, it receives an acknowledgement message from an idle processor (614), at which point it sends the arguments of a first recursive function call (616), continues with the second recursive function call (618), and then waits to receive the result of the first function call (620). FIG. 8 shows how the idle processor processes the recursive call it received from the requesting processor. The idle processor receives the function arguments via a reply message (812) to its acknowledge message from the requesting processor. In response to this message, the idle processor invokes the function on the function's arguments (814), and sends the results back to the requesting processor (816). It then notifies the manager that it is once again idle (818), and waits for another message by returning to its message loop.

FIG. 7 shows how the manager responds to messages from another processor indicating that it is idle. When the manager receives an idle notification, it adds the idle processor to the idle processor list (720). It then checks whether all of the processors are idle (722). When all processors are idle, the manager sends every processor a message that causes it to exit its message-driven loop and return to parallel code (724). In response to this message, each of the processors returns to parallel code as shown in FIG. 8 (see message 820, and step 822 in FIG. 8).

Figure 9:
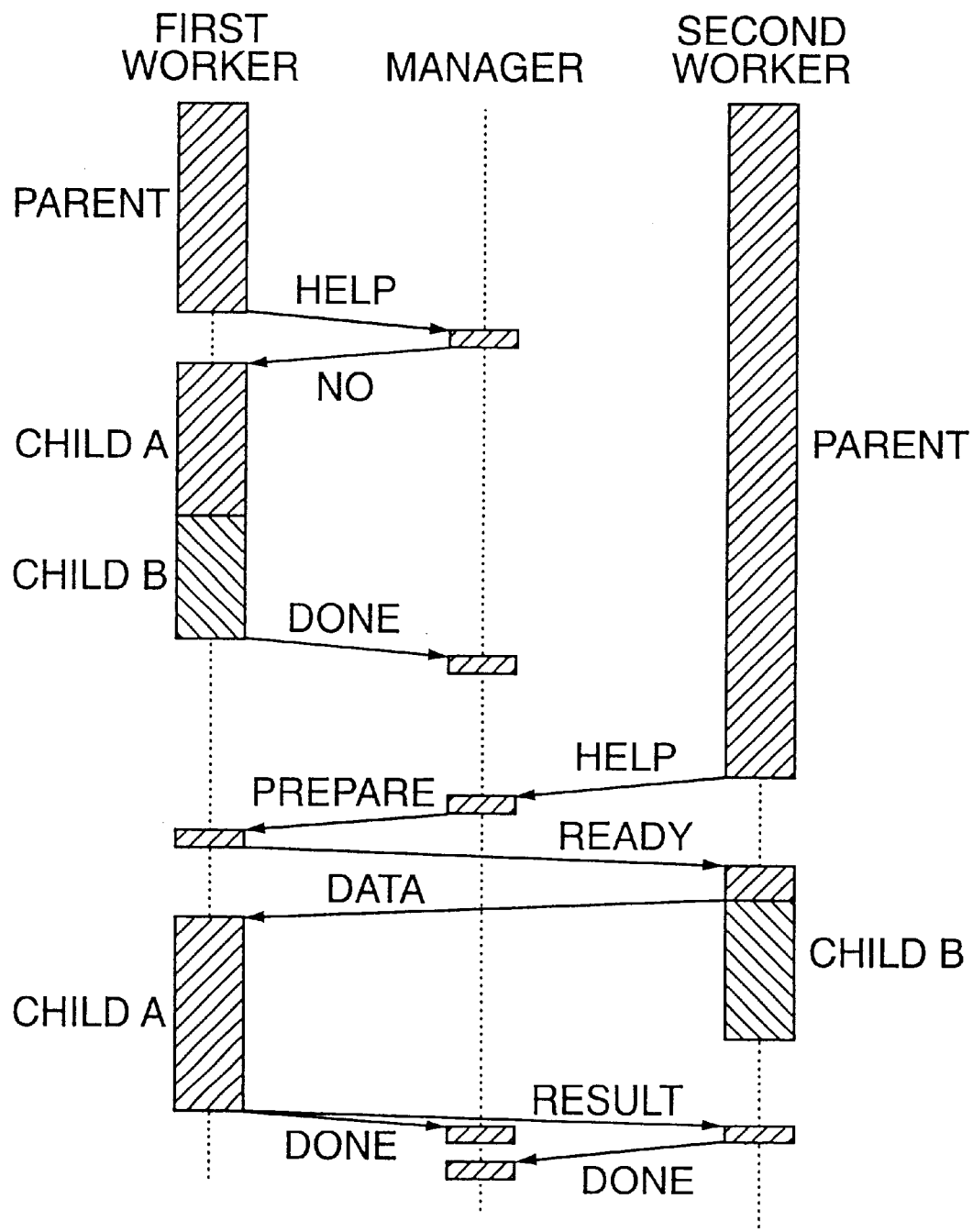
FIG. 9 is a diagram illustrating an example of dynamic load balancing in the Machiavelli system.

To further illustrate dynamic load balancing, FIG. 9 shows an example of load balancing between two worker processors and a manager. In the diagram, time runs vertically downwards. Each worker processor executes a "parent" function call that in turn makes two "child" function calls. The first worker asks for help with its first child call from the manager but does not get it because the second worker is still busy. After the first worker has finished, the second worker asks for help. As the first worker is idle, it is instructed by the manager to help the second worker, which ships over its first child call and proceeds with its second.

Clearly, every processor should not make a request for help before every serial recursive call, because this would result in the manager being flooded with messages towards the leaves of the recursion tree. As noted above, there is a minimum problem size below which it is not worth asking for help, because the time to send the arguments and receive the results is greater than the time to compute the result locally. The time required to send the arguments and receive the results provides a threshold (i.e. a lower bound), which can be compared to the result of the cost function described above: if the cost function for a particular recursive call (that is, the expected time taken by the call) returns a result less than the threshold, the processor does not request help.

The threshold therefore acts as a tuning function for the load-balancing system. Since it is dependent on many factors, including the algorithm, architecture, MPI implementation, problem size, machine size, and input data, it can be supplied as either a compile-time or run-time parameter. Reasonable approximations of this value for each divide-and-conquer function can be found using a routine that measures the time taken to send and receive the arguments and results for a function of size n between two processors, and that also measures the time taken to perform the function. The routine then adjusts n up or down appropriately, until the two times are approximately equal. This provides a rough estimate of the problem size below which it is not worth asking for help.

One possible example of a cost function used to approximate the computational cost of a recursive function call is the function quicksort_cost in section 4.5.1 above. This cost function provides a cost estimate for a recursive function call quicksort, which can be compared against the threshold value. In this case, the threshold value is a cost estimate for sending the arguments to another processor and receiving the results.

Note that most divide-and-conquer functions, which have monotonically decreasing subproblem sizes, act as self-throttling systems using this load-balancing approach. Initially, request traffic is low, because the subproblems being worked on are large, and hence there is a large time delay between any two requests from one processor. Similarly, there is little request traffic at the end of the algorithm, because all the subproblems have costs below the cutoff limit. Requests are made when they can best be filled, towards the middle of an unbalanced algorithm, when some processors have finished but others are still working.

To be able to ship the arguments and results of function calls between processors, they are converted into MPI messages. For every divide-and-conquer function, the preprocessor therefore generates two auxiliary functions. One, given the same arguments as the divide-and-conquer function, wraps them up into messages and sends them to a specified processor. The other has the same return type as the divide-and-conquer function; when called, it receives the result as a message from a specified processor.

Scalar arguments are copied into a single untyped buffer before sending. This enables the runtime system to send all of the scalar arguments to a function in a single message. incurring only the overhead of a single message. However, vector arguments are sent as individual messages. The reason for this is that we expect the vectors to be comparatively long, and their transmission time to therefore be dominated by bandwidth instead of latency. The act of copying separate vectors into a single buffer for sending would require more additional time than the latency of the extra messages.

The act of transmitting function arguments to a processor, and receiving results from it, is effectively a remote procedure call.

5. Conclusion

In view of the many possible implementations of the invention, it should be recognized that the implementation described above is only an example of the invention and should not be taken as a limitation on the scope of the invention. Rather. the scope of the invention is defined by the following claims. I therefore claim as my invention all that comes within the scope and spirit of these claims.

I claim:

1. A method for dynamically balancing a processing workload among parallel processors operating on a program, where the program comprises recursive function calls capable of being executed in parallel, the method comprising:

compiling both parallel and serial versions of the program, the parallel version being capable of executing in a data-parallel fashion on every processor in a team of processors and the serial version being capable of executing on a single processor;

inserting a test function in a serial version of the program;

upon recursive function calls of the program, subdividing each team of processors into smaller teams, with one team per recursive function call;

when the subdividing step results in a team having only one processor, calling the serial version of the code from the parallel version of the code executing on that processor;

executing the test function on a first processor to determine whether computational cost of a recursive function call to be executed on the first processor exceeds a threshold; and when the computational cost exceeds a threshold, shipping a function call to an idle processor, executing the function call on the idle processor and returning results of the function call to the first processor.

2. The method of claim 1 wherein the test function is inserted by a preprocessor while translating the program from a parallel programming language to a serial programming language and calls to a message passing interface.

3. The method of claim 2 wherein the test function is a user-supplied function that evaluates the computational cost of a recursive function call in the program.

4. The method of claim 2 further including:

comparing expected computational cost of the function call with expected communication cost of sending the function call to another processor and receiving results of the function call from the other processor;

based on the comparing step, determining whether to ship the function call to the other processor.

5. A computer readable medium having instructions for performing the steps of claim 1.

6. A computer readable medium comprising:

a preprocessor for converting a parallel program written in a programming language with control parallel and data parallel operations to an imperative, sequential programming code and calls to a message passing interface for inter-processor communication on a parallel computer;

wherein the preprocessor is operable to generate a parallel and a serial version of the parallel program and to insert a test function in the serial version of the program to evaluate computational cost of a function call in the serial version;

a compiler for compiling the imperative programming code and the calls to the message passing interface generated by the preprocessor;

a message passing interface run-time library for performing operations of the message passing interface in response to the calls to the message passing interface;

a parallel language run-time library for keeping track of idle processors during execution of the parallel program, for managing requests to send the function call from a requesting processor to an idle processor when the requesting processor determines that the computational cost of the function call exceeds a threshold; and a linker for linking the compiled imperative programming code and calls to the message passing interface with the message passing interface run-time library and the parallel language run-time library.

7. The computer readable medium of claim 6 wherein the preprocessor inserts code for evaluating the test function to determine whether the computational cost of the function call to be executed on a first processor exceeds a threshold and for shipping the function call to an idle processor.

8. The computer readable medium of claim 7 wherein the threshold is approximated as a measure of time required to send arguments of the function call to another processor and to receive results back from the idle processor.

9. The computer readable medium of claim 6 wherein the parallel program includes a split function to split the nested parallel program into recursive function calls, each capable of being executed in parallel on a team of processors; and wherein the preprocessor is operable to generate code for switching from the parallel to the serial version of the program when the program recurses to a point where a team has a single processor.

10. The computer readable medium of claim 7 wherein the preprocessor is operable to insert a cost function in the parallel version of the program to compute computation cost of each recursive function call, and is operable to insert code for computing the number of processors in each team based on the computational cost of the recursive function calls.

11. A computer readable medium having a nested parallel program for execution in a parallel machine with two or more processors, the medium comprising:

code for splitting the program into recursive function calls and assigning each recursive function call to a subset of the processors;

code for evaluating when a subset of processors includes a single processor; and code for evaluating computational cost of a recursive function call and for shipping a function call to an idle processor when the computational cost exceeds a threshold.

12. A method for dynamically balancing a processing workload among parallel processors operating on a program, where the program comprises function calls capable of being executed in parallel, the method comprising:

executing the program on each processor in a group of processors in a parallel computer, the program including a test function for evaluating the computational cost of a function call at runtime;

executing the test function on a first processor to determine whether computational cost of the function call to be executed on the first processor exceeds a threshold; and when the computational cost computed by the test function exceeds a threshold, shipping the function call to an available processor, executing the function call on the available processor and returning results of the function call to the first processor.

13. A parallel processing method for executing a parallel divide and conquer program having recursive calls capable of being executed in parallel, the method comprising:

spreading a parallel data structure of the program across processors in a parallel computer, at each recursive call of the program, subdividing a group of processors into subgroups, with one subgroup per parallel function call;

selecting the number of processors in each subgroup to approximate the computational cost of the parallel function call for each subgroup;

in one of the processors acting as a manager, mediating among processors that are idle, including:
when an idle processor is detected, adding the idle processor to an idle processor queue;
when an overloaded processor is about to recurse on a function call having a computational size greater than a predetermined threshold, providing the idle processor with a function call from the overloaded processor;

using a lazy collection oriented data type to represent the data of the parallel program;

deferring inter-processor communication by leaving the lazy collection oriented data type in a lazy state until a function call is made that operates on the lazy collection oriented data type and requires the lazy collection oriented data type to be redistributed among the processors;

in a global communication step, redistributing the data structures among the subgroups.

* * * * *

UNITED STATES PATENT AND TRADEMARK OFFICE
CERTIFICATE OF CORRECTION

PATENT NO. : 6,292,822 B1
DATED : September 18, 2001
INVENTOR(S) : Jonathan C. Hardwick It is certified that error appears in the above-identified patent and that said Letters Patent is hereby corrected as shown below:

Column 2,
Line 66, "α" should read -- $a$ --.

Column 3,
Line 1, "α" should read -- $a$ --.
Line 9, "α" should read -- $a$ --.

Column 4,
Line 54, "coinpiler" should read -- compiler --.

Column 5,
Line 43, "ii" should read -- in --.

Column 6,
Line 49, "function-shippingactive" should read -- function-shipping active --.

Column 8,
Line 38, "to which is" should read -- to which it is --.

Column 9,
Line 12, "d and c (p)" should read -- d_and_c (p) --.
Line 17, "$P_1, ...P_n$" should read -- $(p_1,...p_n)$ --.

Column 10,
Line 39, "function." should read -- function, --.

Column 12,
Line 18, "NP-complete" should read -- NP-complete. --.
Line 43, "I lowever" should read -- However --.
Line 50, "mi" should read -- $m$ --.
Line 54, "ith" should read -- $i^{th}$ --.
Line 58, "ith" should read -- $i^{th}$ --.

Column 14,
Line 17, "n+J-P" should read -- $n+1-P$ --.

UNITED STATES PATENT AND TRADEMARK OFFICE
CERTIFICATE OF CORRECTION

PATENT NO.    : 6,292,822 B1
DATED         : September 18, 2001
INVENTOR(S)   : Jonathan C. Hardwick It is certified that error appears in the above-identified patent and that said Letters Patent is hereby corrected as shown below:

Column 15,
Line 42, "eqi" should read -- eql --.
Line 49, "(les.)" should read -- (les) --.
Lines 51 and 52, "eqi" should read -- eql --.

Column 16,
Line 7, "in" should read -- In --.

Column 18,
Line 2, "Table 1" should read -- Table 1 --.
Line 28, "forreduce" should read -- for reduce --.
Line 49, "$v_0$, $V_1$, $v_2$" should read -- $v_0$, $v_1$, $v_2$ --.
Line 52, "$v_{i-1}$" should read -- $v_{i-i}$ --.
Line 55, "...." should read -- ... --.
Line 55, "$v_{i-1}$" should read -- $v_{i-1}$ --.

Column 20,
Line 11, "nun_" should read -- *num_* --.
Line 23, "[0]" should read -- *[ ]* --.

Column 21,
Line 27, "to," should read -- to. --.
Lines 60-61, "s_to_re" should read -- store --.

Column 23,
Line 57, "*mxn*" should read -- *mxn,* --.

Column 24,
Line 66, "example." should read -- example, --.

UNITED STATES PATENT AND TRADEMARK OFFICE
CERTIFICATE OF CORRECTION

PATENT NO.   : 6,292,822 B1
DATED        : September 18, 2001
INVENTOR(S)  : Jonathan C. Hardwick It is certified that error appears in the above-identified patent and that said Letters Patent is hereby corrected as shown below:

Column 25,
Line 18, "fi" should read -- n --.
Line 23, "B,interleave(A" should read -- B, interleave (A --.
Line 48, "4.3 .1" should read -- 4.3.1 --.
Line 64, "mean)¨2" should read -- mean) ^2 --.

Column 26,
Line 7, "mean)¨2" should read -- mean) ^2 --.
Line 27, "resuit;" should read -- result; --.

Column 27,
Line 64, "model" should read -- model. --.

Column 28,
Line 14, "divconc qcost" should read -- divconc_qcost --.

Column 29,
Line 5, "lector" should read -- vector --.
Line 9, "now." should read -- now, --.

Column 30,
Line 7, "522." should read -- 522, --.

Column 33,
Line 23, "(et" should read -- get --.
Line 30, "First" should read -- first --.

Column 34,
Line 6, "{ j-; }" should read -- { j--; } --.
Line 54, "which team" should read -- which_team --.

UNITED STATES PATENT AND TRADEMARK OFFICE
CERTIFICATE OF CORRECTION

PATENT NO.    : 6,292,822 B1
DATED         : September 18, 2001
INVENTOR(S)   : Jonathan C. Hardwick It is certified that error appears in the above-identified patent and that said Letters Patent is hereby corrected as shown below:

<u>Column 35,</u>
Line 31, "unable steal" should read -- unable to steal --.
Line 58, "if" should read -- If --.

<u>Column 36,</u>
Line 18, "(716)." should read -- (716), --.

<u>Column 37,</u>
Line 66, "message. incurring" should read -- message, incurring --.

<u>Column 38,</u>
Line 17, "Rather. the" should read -- Rather, the --.

Signed and Sealed this

Twelfth Day of November, 2002

Attest:

JAMES E. ROGAN
*Attesting Officer*   *Director of the United States Patent and Trademark Office*